US006816967B1

(12) United States Patent
Iijima et al.

(10) Patent No.: US 6,816,967 B1
(45) Date of Patent: Nov. 9, 2004

(54) ELECTRONIC EQUIPMENT AND DATA PROCESSING METHOD THEREFOR

(75) Inventors: Yuko Iijima, Kanagawa (JP); Eiji Tadokoro, Chiba (JP); Hiraku Inoue, Kanagawa (JP)

(73) Assignee: Sony Corporation, Tokyo (JP)

( * ) Notice: Subject to any disclaimer, the term of this patent is extended or adjusted under 35 U.S.C. 154(b) by 842 days.

(21) Appl. No.: 09/595,399

(22) Filed: Jun. 17, 2000

(30) Foreign Application Priority Data

Jun. 18, 1999 (JP) ........................................ P11-171797

(51) Int. Cl.[7] ................................................ H04L 9/00
(52) U.S. Cl. ...................................... 713/164; 336/94
(58) Field of Search ................................ 713/164–202; 380/3, 45, 44, 9, 21, 46, 50, 186; 386/94, 60, 52

(56) References Cited

U.S. PATENT DOCUMENTS 5,425,025 A * 6/1995 Tahara ........................ 370/394
5,915,025 A * 6/1999 Taguchi et al. ............... 380/44
6,256,390 B1 * 7/2001 Okuyama et al. ........... 380/201
6,360,320 B1 * 3/2002 Ishiguro et al. ............. 713/164
6,584,275 B1 * 6/2003 Blatter ......................... 386/94

* cited by examiner

Primary Examiner—Charles Rones
Assistant Examiner—Belix M. Ortiz
(74) Attorney, Agent, or Firm—Jay H. Maioli

(57) ABSTRACT

An electronic device receives data containing content data transmitted through a bus in the form of a packet. The electronic equipment has a receiving portion, a judgment portion and an output controller. The receiving portion receives the data transmitted in the form of a packet through the bus. The judgment portion extracts copyright information from the data supplied from the reception portion, and judges on the basis of the copyright information thus extracted whether the content data contained in the data received are allowed to be copied. The output controller is supplied with the judgment result from the judgment portion to generate notification data corresponding to the judgment result.

41 Claims, 17 Drawing Sheets

ISOCHRONOUS PACKET

Sy

DATA FIELD ent result.

ELECTRONIC EQUIPMENT AND DATA PROCESSING METHOD THEREFOR

BACKGROUND OF THE INVENTION

1. Field of the Invention

The present invention relates to electronic equipment and a data processing method therefor, and particularly to electronic equipment for receiving data through a bus and a data processing method therefor.

2. Description of the Related Art

Recently, electronic equipment such as a personal computer, a digital video camera or the like which can mutually communicate data through an IEEE1394 bus has been developed, and it is expected that the number of types of such electronic equipment will be increased in the near future.

The content data (audio data, video data, etc.) communicated on the IEEE1394 bus are digital data. In order to prevent the content data from being copied endlessly, information indicating whether the copy of the data concerned is allowed or not (copyright information) is described at a predetermined position in an isochronous packet of the content data. In the case of electronic equipment connected to the IEEE1394 bus, even when a user makes an instruction such as recording or the like of data which are prohibited from being copied on the basis of the copyright information, the instruction (recording or the like) is not executed, whereby any copy of the content data concerned is not produced.

If a user can recognize the copyright information as described above, the user does not make any instruction on the copy such as recording or the like for content data which are impossible to be copied, and this is convenient. However, there is no electronic equipment having a function of notifying the user of the copyright information set in the content data communicated on the IEEE1394 bus. Furthermore, when content data transmitted from a transmission side are encrypted, the content data thus transmitted could not be decoded if a decoding key cannot be correctly generated due to a time lag of transmission/reception timing.

SUMMARY OF THE INVENTION

It is therefore an object of the present invention to provide electronic equipment which resolves the above-mentioned problem.

It is another object of the present invention to provide a data processing method for electronic equipment which resolves the above-mentioned problem.

It is further object of the present invention to provide a data processing method which resolves the above-mentioned problem.

According to the present invention, there is provided electronic equipment for receiving at least data containing content data transmitted in the form of a packet through a bus, comprising: a receiving portion for receiving the data transmitted in the form of a packet through the bus; a judgment portion for extracting copyright information from data supplied from the receiving portion, and judging on the copyright information thus extracted at least whether the content data contained in the data thus received are allowed to be copied or not; and an output controller for receiving the judgment result from the judgment portion and generating and outputting notification data corresponding to the judgment result.

According to the present invention, there is provided a data processing method for electronic equipment for receiving at least data containing content data transmitted in the form of a packet through a bus, which comprises the steps of: receiving the data transmitted in the packet form from the bus; extracting copyright information from the data received; judging on the basis of the copyright information thus extracted at least whether the content data contained in the data received are allowed to be copied or not; and generating and outputting notification data corresponding to the judgment result.

According to the present invention, there is provided electronic equipment for receiving at least encrypted data containing content data and attribute information indicating the attribute of an encrypting key transmitted in the form of a packet through a bus, which comprises: a receiving portion for receiving the data transmitted in the packet form through the bus; a judgment portion for extracting copyright information from the data supplied from said receiving portion and judging on the basis of the copyright extracted at least whether the content data contained in the data received are allowed to be copied or not; and an output controller for receiving the judgment result from the judgment portion and generating and outputting notification data corresponding to the judgment result.

According to the present invention, there is provided electronic equipment for receiving at least encrypted data containing content data and attribute information indicating the attribute of an encrypting key which are transmitted in the form of a packet through a bus, which comprises: a receiving portion for receiving the data transmitted in the packet form through the bus; a key generator for generating plural decoding keys; a decoding portion for performing decoding processing on data supplied from the receiving portion on the basis of a decoding key from the key generator; and a controller for selecting one of plural decoding keys output from the key generator on the basis of the attribute information extracted from the data output from the receiving portion.

According to the present invention, there is provided a data processing method using at least two electronic apparatuses which are connected to each other through a bus, one apparatus serving as a reception side at least receiving encrypted data containing content data and attribute information indicating the attribute of an encrypting key which are transmitted in the form of a packet from the other apparatus serving as a transmission side, which comprises the steps of: receiving the data transmitted in the packet form through said bus on the electronic apparatus serving as the reception side; generating plural decoding keys on the electronic apparatus serving as the reception side; performing decoding processing on the data received on the basis of the decoding key generated in the electronic apparatus serving as the reception side; and selecting one of plural decoding keys generated on the basis of the attribute information extracted from the data received on the electronic apparatus serving as the reception side, and using the decoding key thus selected for the decoding processing.

DETAILED DESCRIPTION OF THE DRAWINGS

Preferred embodiments according to the present invention will be described hereunder with reference to the accompanying drawings.

Figure 1:
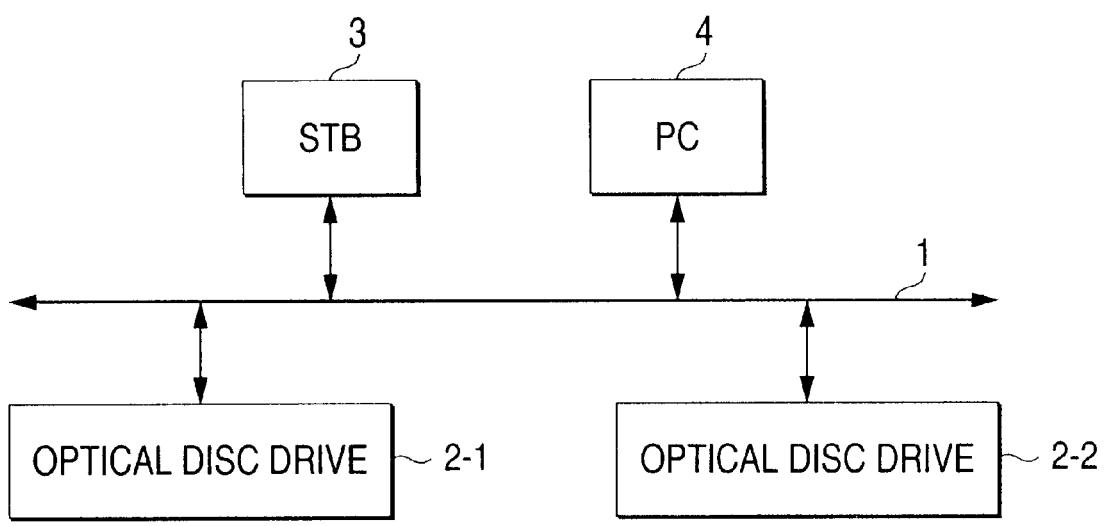
FIG. 1 is a block diagram showing the construction of a bus network system comprising electronic equipment to which the present invention is applied.

FIG. 1 shows optical disc recording and/or reproducing apparatuses 2-1, 2-2 to which the present invention is applied (they are hereinafter merely referred to as "optical disc drive", and they are described merely as "optical disc drive" if it is unnecessary to individually discriminate them from each other), and also shows a bus network system comprising a set top box (STB) 3, and a personal computer (PC) 4. Each of the optical disc drive 2 and the personal computer 4 is provided with an IEEE1394 interface through which it is connected to the IEEE1394 bus 1 so as to mutually communicate the content data such as audio data, video data, program data, etc. with one another. Each of the optical disc drive 2 and the personal computer 4 can control the operation of other electronic equipment on the bus network by transmitting a control signal through the IEEE1394 bus 1.

In the following description, an IEEE1394 interface 35 which is mainly owned by the optical disc drive 2 will be representatively described, and the description on the IEEE1394 interface equipped to the set top box 3 or the personal computer 4 is omitted from the following description because the IEEE1394 thereof has the same construction as the IEEE1394 of the optical disc drive 2.

Next, the optical disc drive 2 of the present invention will be described with reference to FIG. 2.

A magnetooptical disc 11 serving as a recordable optical disc which is used in an optical disc drive and on which audio data are recorded is rotationally driven, for example at a constant linear speed by a spindle motor 12. When a recording/reproducing operation is carried out, the magnetooptical disc 11 is exposed to laser beams having an output level necessary to recording/reproducing operation. The optical head 13 comprises a laser-diode, a polarizing beam splitter, an object lens 13a, a photodetector, etc. The object lens 13a is supported by an actuator 14 so that it is displaceable in a radial direction (so-called tracking direction) and such a direction that the object lens 13a approaches to or moves away from the disc (so-called focusing direction). When the recording operation is carried out, the optical head 13 irradiates a laser beam having a high output level to the mangetooptical disc 11 to heat the recording track of the magnetooptical disc 11 up to the Curie Temperature. On the other hand, when the reproducing operation is carried out, the optical head 13 irradiates to the magnetooptical disc 11 a laser beam having an output level lower than that of the recording operation to detect data from the reflection light with the magnetic Kerr effect.

A magnetic head 16a which is disposed so as to confront the optical head 13 through the magnetooptical disc 11 applies to the magnetooptical disc 11 a vertical magnetic field modulated on the basis of recording data supplied. The optical head 13 and the magnetic head 16a are movable in the radial direction of the magnetooptical disc 11 by a sled mechanism 15.

In the reproducing operation, the information read out from the magnetooptical disc 11, that is, the output signal from the optical head 13 is supplied to an RF amplifier 17. The RF amplifier 17 subjects the output signal information from the optical head 13 thus supplied to a predetermined operation to obtain a reproduction RF signal, a tracking error signal TE, a focus error signal FE, groove information GFM (absolute position information recorded as a pregroove (wobbling groove) on the mangetooptical disc 11), etc. The reproduction RF signal from the RF amplifier 17 is supplied to an encoder/decoder 18. The tracking error signal TE and the focus error signal FE are supplied to a servo circuit 19, and the groove information GFM is supplied to an address decoder 20.

The servo circuit 19 generates various servo driving signals from the tracking error signal TE and the focus error signal FE supplied thereto and a track jump instruction, an access instruction, rotational speed detecting information of a spindle motor 12, etc. input from a system controller 21, and controls the actuator 14 and the sled mechanism 15 to perform focus and tracking control and also controls the spindle motor to rotate at a constant linear speed.

The address decoder 20 decodes the groove information GFM supplied from the RF amplifier 17 to extract address information. The address information thus extracted is supplied to the system controller 21, and used for various control operations. The reproduction RF signal is subjected to decoding processing such as EFM demodulation, CIRC, etc. in the encoder/decoder 18. In this processing, an address, sub code data, etc. are also extracted and supplied to the system controller 11.

The audio data (sector data) which are subjected to the decoding processing such as the EFM demodulation, CIRC, etc. in the encoder/decoder 18 are temporarily written into a buffer memory (RAM) 23 by a memory controller 22.

The data reading operation of the optical head 13 from the magnetooptical disc 11 and the data transmission in the signal processing system from the optical head 13 to the buffer memory 23 are carried out at a rate of 1.41 Mbit/sec, and the reading operation of information from the magnetooptical disc 11 is carried out intermittently.

The data written in the buffer memory 23 are read out from the buffer memory 23 at such a timing that the data transmission rate is equal to 0.3 Mbit/sec, and supplied to the encoder/decoder 24. In the encoder/decoder 24, the data are subjected to signal reproduction processing such as expansion processing associated with the audio compression processing, etc., so that the data are converted to 4.1 KHz sampled and 16-bit quantized digital audio signals. The digital audio signal is converted to an analog audio signal in a D/A converter 25, and subjected to level adjustment, impedance adjustment, etc. in an output processor 26. The data thus processed are output as an analog audio signal Aout from a line output terminal 27 to external equipment (not shown). The analog signal from the D/A converter 25 is supplied as a headphone output Hpout to a headphone output terminal 37, and output to a headphone (not shown) connected to the output terminal 37.

The digital audio signal output from the encoder/decoder 24 may be output as a digital audio signal Dout from the digital output terminal 31 through a digital interface (I/F) 32 to external equipment (not shown). For example, the digital audio signal Dout is output from the optical disc drive 2 to external equipment (not shown) in a transmission style using an optical cable.

No restriction is imposed on the standard to be applied to the digital interface 32. However, in this embodiment, IEC958 (International Electrotechnical Commission) which is one of the standards of the digital audio interface is assumed to be applied.

In the sound recording operation, an analog audio signal Ain as a recording signal supplied to a line input terminal 28 is converted to a digital audio signal in an A/D converter 29, and then supplied to the encoder/decoder 24 to be subjected to compression processing on the basis of a compression method such as audio compression encode processing, for example, ATRAC (Adaptive Transform Acoustic Coding) or the like. When the digital audio signal Din is supplied from the external equipment (not shown) to the digital input terminal 30, a control code, etc. are extracted from the digital audio signal Din in the digital interface 32, and then supplied to the encoder/decoder 24, so that the above analog audio signal is subjected to the audio compression encoding processing. The input signal from the microphone may be used as a recording signal by providing a microphone input terminal (not shown). In this case, the input signal from the microphone is subjected to the compression signal processing in the encoder/decoder 24 as in the case of the analog audio signal supplied to the line input terminal 28.

The recording data compressed by the encoder/decoder 24 are temporarily written and accumulated in the buffer memory 23 under the control of the memory controller 22. These data are read out from the buffer memory 23 and supplied to the encoder/decoder 18 every predetermined amount of data to be subjected to encode processing such as CIRC encode, EFM demodulation, etc., and then supplied to a magnetic head driving circuit 16.

The magnetic head driving circuit 16 supplies a magnetic head driving signal to the magnetic head 16a on the basis of the recording data which has been subjected to the encode processing. That is, N-pole or S-pole vertical magnetic field is applied from the magnetic head 16a to the magnetooptical disc 11. At this time, the system controller 21 supplies a control signal to the optical head 13 to output laser beams having the recording level.

An operating portion 22 indicates a site to be subjected to a user's operation, and is provided with operators serving as various types of operating keys 33a or dials. AS the operators are provided keys 33a for instructing recording/reproducing operation such as reproduction, recording, temporarily stop, stop, FF (fast feeding), REW (rewinding), AMS (automatic music search), etc., keys 33a on normal reproduction, program reproduction, random reproduction, etc., keys 33a for display mode operations for switching a display state in a display portion 34, and keys 33a for program edition operations such as track (program) division, track linkage, track deletion, track name input, disc name input, etc. The operation information based on these operating keys 33a or dials is supplied to the system controller 21.

A reception portion 40 is supplied with a command signal based on infrared rays which is transmitted from a remote controller 41, and outputs the command code (operating information) corresponding to the command signal to the system controller 21. The system controller 21 controls the overall operation of the optical disc drive in accordance with the operating information input from the operation portion 33 or the reception portion 40.

The display portion 34 drives a liquid crystal panel constituting the display portion 34 on the basis of the control signal of the system controller 21 to display display data (numerals, characters, symbols, etc. indicating the operation mode state, the track number, the recording time/reproducing time, the editing operation state of the disc under recording/reproducing operation). The display portion 34 also displays character information (track name, etc.) which is recorded in the magnetooptical disc 11 while appended to a program serving as main data. The display portion 34 further displays the copyright information of the content data input from another electronic equipment (for example, the set top box 3 shown in FIG. 1 or the like) through the IEEE1394 bus 1 to the optical disc drive 2 on the basis of the control signal from the system controller 21.

The IEEE1394 interface (I/F) 35 communicates the content data with another electronic equipment through the IEEE1394 bus 1. The details of the IEEE1394 interface 35 will be described later.

The system controller 21 is constructed by a microcomputer comprising CPU, an internal interface portion, etc., and it reads out and executes programs for implementing various operations stored in a program ROM 38, thereby controlling the overall operation of the optical disc drive 2. Data, programs, etc. which are required to perform various processing by the system controller 21 are suitably stored in a work RAM 39.

Figure 3A:
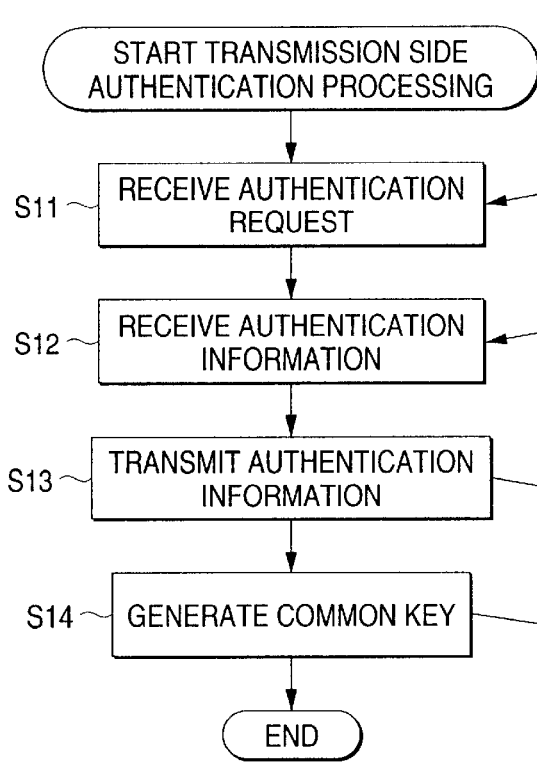
FIG. 3 is a flowchart showing authentication processing.
Figure 3B:
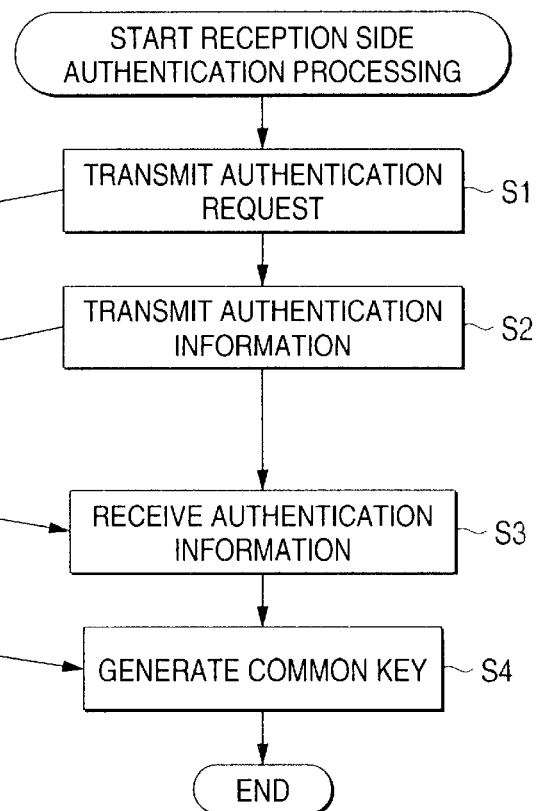

Next, authentication processing which is executed as pre-processing when data communications are carried out through the IEEE1394 bus 1 between electronic equipment constituting the bus network system will be described with reference to the flowchart of FIGS. 3A and 3B.

For example, in the case where the set top box 3 distributes audio data as an isochronous packet to the IEEE1394 bus 1, when the optical disc drive 2 is about to receive the isochronous packet of the audio data, the authentication processing is started before the reception of the isochronous packet concerned is started.

The system controller 21 controls the IEEE1394 interface 35 on the basis of a program for authentication stored in a program ROM 38, whereby the authentication processing is performed in the optical disc drive 2 serving as the reception side, and also the controller of the set top box 3 controls the built-in IEEE1394 interface, whereby the authentication processing is performed in the set top box 3 serving as the transmission side as in the case of the optical disc drive 2.

In step S1, the IEEE1394 interface 35 of the optical disc drive 2 transmits an authentication request through the IEEE1394 bus 1 to the set top box 3. The authentication request is received by the IEEE1394 interface of the set top box 3 in step S11.

In step S2, the IEEE1394 interface 35 of the optical disc drive 2 transmits the authentication information thereof through the IEEE1394 bus 1 to the set top box 3. This authentication information is received by the IEEE1394 interface of the set top box 3 in step S12.

Likewise, in step S13, the IEEE1394 interface of the set top box 3 transmits the authentication information thereof through the IEEE1394 bus 1 to the optical disc drive 2. This authentication information is received by the IEEE1394 interface 35 of the optical disc drive 2 in step S3.

Thereafter, in step S14, a common key used to encrypt the isochronous packet of the audio data is generated in the IEEE1394 interface of the set top box 3. On the other hand, in step S4, a common key used to decode the encrypted isochronous packet is generated in the IEEE1394 interface 35 of the optical disc drive 2. After the authentication processing is finished as described above, the reception of the isochronous packet of the audio data is actually started.

Several seconds to several tens of seconds are needed from the start time of the authentication processing described above to the finish time thereof. However, for example when the user of the optical disc drive 2 instructs to cease the reception of the audio data from the set top box 3 before the authentication processing is finished, that is, during the execution of the authentication processing, the optical disc drive 2 and the set top box 3 cannot execute the processing corresponding to a newly input instruction during a time period of several seconds to several tens of seconds unless the authentication processing under execution is immediately stopped.

Therefore, in order to solve the above disadvantage, according to this embodiment, interrupt processing is executed in the IEEE1394 interfaces of the optical disc drive 2 and the set top box 3 in parallel to the authentication processing described above.

Figure 4:
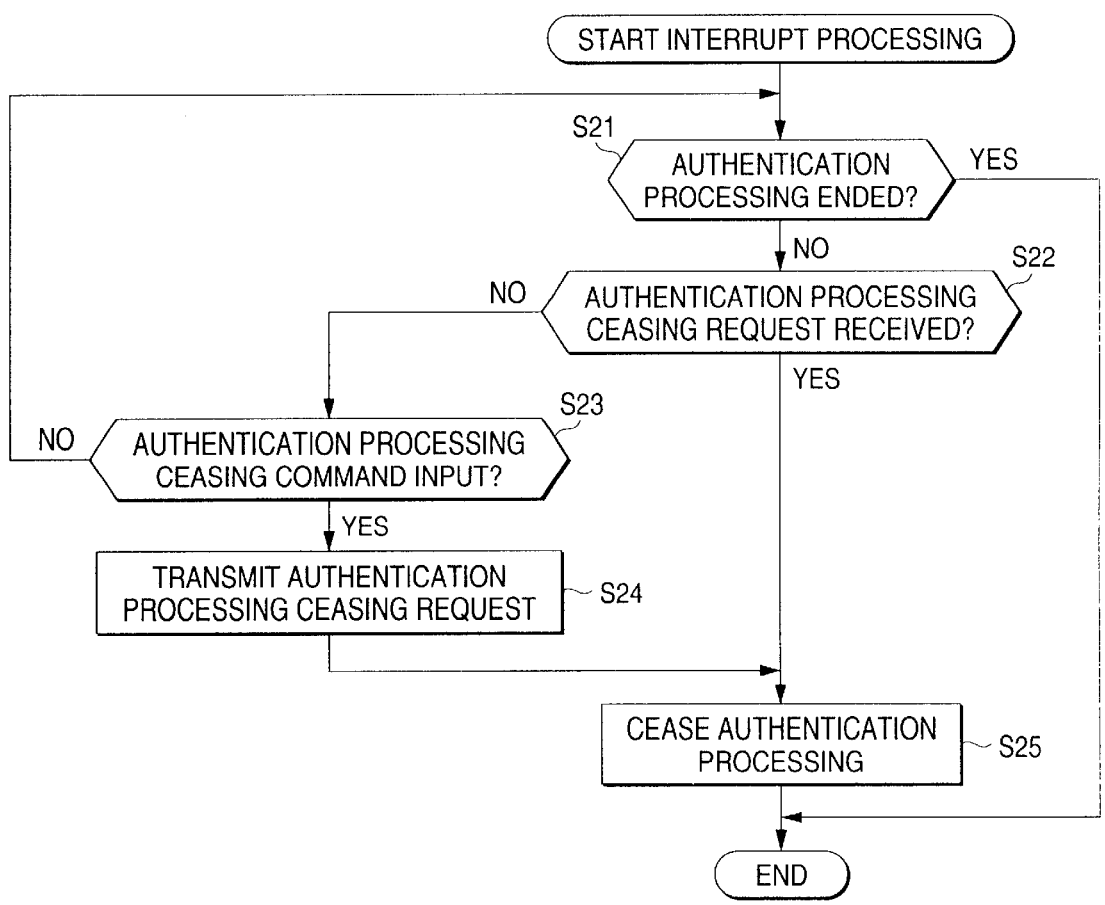
FIG. 4 is a flowchart showing interrupt processing.

The interrupt processing will be described with reference to the flowchart of FIG. 4.

In the following description made with reference to the flowchart of FIG. 4, the operation of the IEEE1394 interface 35 of the optical disc drive 2 will be described. However, it is assumed that the same operation is also carried out in the IEEE1394 interface of the set top box 3.

In step S21, the IEEE1394 interface 35 of the optical disc drive 2 judges whether the authentication processing has finished or not. If it is judged that the authentication processing has not yet been finished, the processing goes to step S22. In step S22, the IEEE1394 interface 35 judges whether an authentication processing ceasing request is received from the authentication partner (in this case, the IEEE1394 interface of the set top box 3). If it is judged that no authentication processing ceasing request is received, the processing goes to step S23. In step S23, the IEEE1394 interface 35 judges whether a command for ceasing the authentication processing or the like is input from the user. If it is judged that the command for ceasing the authentication processing is input, the processing goes to step S24. In step S24, the IEEE1394 interface 35 transmits an authentication processing ceasing request to the IEEE1394 interface of the set top box 3 serving as the communication partner.

In step S25, the IEEE1394 interface 35 immediately ceases the authentication processing.

If it is judged in step S21 that the authentication processing is finished, the interrupt processing is also finished.

If it is judged in step S22 that the authentication processing ceasing request is received, the processing goes to step S25 to cease the authentication processing immediately.

If it is judged in step S23 that any command for ceasing the authentication processing is not input, the processing returns to step S21 and the subsequent processing is repeated.

The input of the command for ceasing the authentication processing or the like in the step S23 means that a reproduction stop button, a recording stop button, an eject button, a power source button or the like is pushed or operated.

When there occurs such a situation that the authentication processing is not needed, the authentication processing is immediately stopped by executing the interrupt processing in parallel to the authentication processing, and thus a newly input command or the like can be processed even without waiting for the normal finish of the authentication processing.

Next, the restoration processing executed when a bus reset occurs in the bus network system will be described. Each piece of electronic equipment constituting the bus network stem discriminates other electronic equipment by using a node ID which is dynamically allocated to each electronic equipment. Accordingly, when the bus reset occurs, that is, the node ID allocated to each electronic equipment is temporarily reset due to new additional connection of electronic equipment to the bus network system in the middle of the data communication between electronic equipment on the bus network, and thus a new node ID is allocated to each piece of electronic equipment, the node ID of a communication partner is unfavorably changed.

Figure 5:
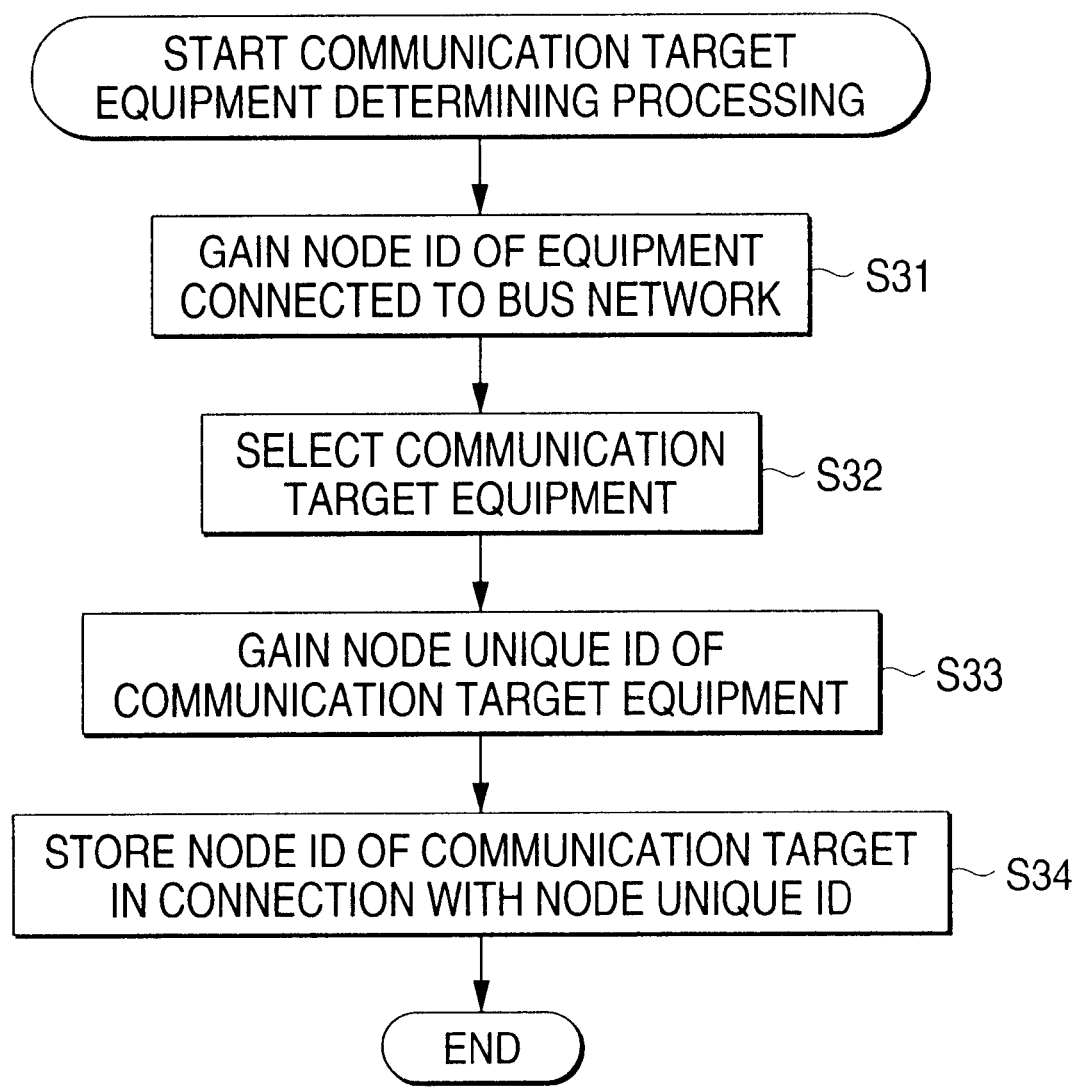
FIG. 5 is a flowchart showing a communication target equipment determining processing.
Figure 6:
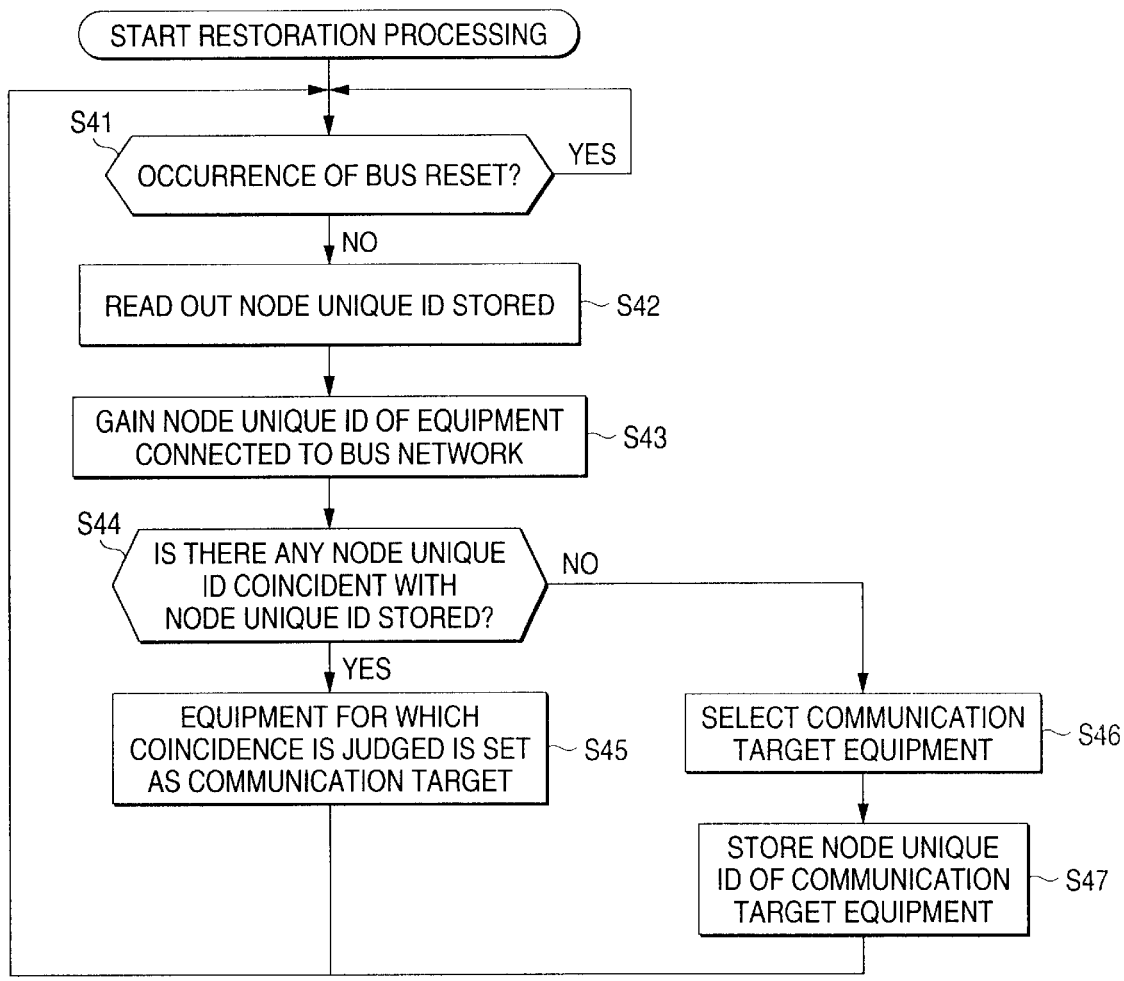
FIG. 6 is a flowchart showing restoring processing.

Therefore, in this embodiment, the communication partner is determined by communication target equipment determining processing shown in FIG. 5, and then the restoration processing shown in FIG. 6 is carried out during the data communication, thereby preventing any trouble from occurring in the data communication being executed even when the node ID is changed due to occurrence of the bus reset.

In the optical disc drive 2, the communication target equipment determining processing and the restoration processing are mainly performed through the control of the IEEE1394 interface 35 by the system controller 21 on the basis of a program for the communication target equipment determining processing or a program for the restoration processing stored in the program ROM 38.

In step S31, the IEEE1394 interface 35 achieves the node IDs of all the electronic equipment connected to the IEEE 1394 bus 1. If the user of the optical disc drive 2 in step S32 selects electronic equipment serving as a communication partner (hereinafter referred to as "communication target equipment"), in step S33 the IEEE1394 interface 35 achieves inherent information such as a node unique ID with which the communication target equipment concerned can be specified (hereinafter referred to as "inherent information") In step S34 the IEEE interface 35 associates the inherent information of the communication target equipment with a node ID, and then stores it into a predetermined storage medium (for example, work RAM 39 or the like).

After the communication target equipment is determined and the node ID is associated with the inherent information as described above and stored, the node ID is used as the information for specifying a communication target (partner), and the communication is started. In parallel to the above operation, the restoration processing shown in FIG. 6 is executed.

In step S41, the IEEE1394 interface 35 judges whether the bus reset occurs or not. It is on standby until it is judged that the bus reset occurs, and if it judges that the bus reset occurs, the processing goes to step S42. Instep S42 the IEEE1394 interface 35 reads out the inherent information stored in the step S34 of the communication target equipment determining processing (for example, node unique ID). In step S43, the IEEE1394 interface 35 achieves the inherent information of each electronic equipment connected to the IEEE1394 bus 1.

In step S44, the IEEE interface 35 judges whether there is any electronic equipment whose inherent information (achieved in step S43) is coincident with the inherent information read out in step S42 (that is, whether there is any electronic equipment which had served as the communication partner just before the bus reset occurred). If it is judged that electronic equipment having the coincident inherent information exists, the processing goes to step S45.

In step S45, subsequent to the state before the bus reset, the IEEE1394 interface 35 sets as a communication partner the electronic equipment having the inherent information coincident with the stored inherent information, and achieves the node ID thereof, thereafter restarting the data communication with the electronic equipment concerned. Thereafter, the processing returns to the step S41 and the subsequent processing is repeated.

If it is judged in step S44 that the inherent information of each electronic equipment achieved in the step S43 is not coincident with the inherent information read out in the step S42 (that is, there does not exist any electronic equipment which had served as a communication partner just before the bus reset occurred), the processing goes to step S46. In step S46, the IEEE1394 interface 35 notifies the system controller 21 that there does not exit any electronic equipment serving as the communication partner just before the bus reset, and the system controller 21 prompts the user to select new communication target equipment in connection with this notification. In response to this prompt, the user selects new communication target equipment.

In step S47, the IEEE1394 interface 35 achieves and stores the inherent information of the communication target equipment newly selected in step S46 and the node ID, and starts the data communication by using the node ID.

If the restoration processing is set to be carried out at the time when the power source of the electronic equipment is turned on (that is, the electronic equipment is started), the electronic equipment serving as the communication partner when the power source was previously turned off can be automatically set as a new communication partner without executing the communication target equipment determining processing of FIG. 5. In order to enable the restoration processing to be carried out at the starting time, the medium storing the inherent information is required to continuously hold its recording content even while the power source of the electronic equipment is turned off.

Further, if various parameters associated with the communication target equipment can be stored in addition to the inherent information of the communication partner, this information can be used after the bus reset or after the electronic equipment is started, so that the time needed until the data communication is actually started can be shortened.

Next, there will be described a function which is owned by each of the optical disc drive 2 and the personal computer 4 and informs a user of copyright information containing information indicating allowance or prohibition of copying, etc. which is set for content data such as audio data, etc. received through the IEEE1394 bus 1 (hereinafter referred to as "copyright information notifying function"). Here, the copyright information is described in the isochronous packet of content data such as audio data or the like.

Figure 7:
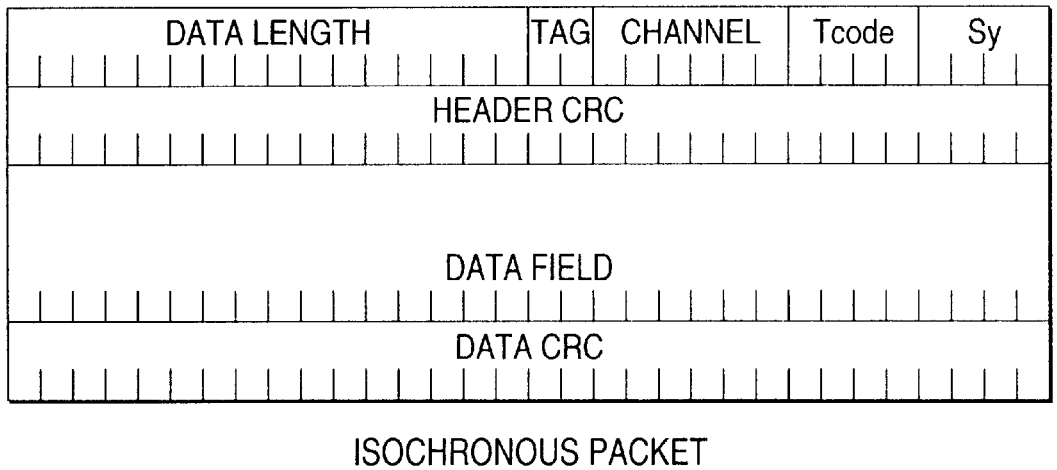
FIG. 7 is a diagram showing the data structure of an isochronous packet.

FIG. 7 shows the data structure of the isochronous packet of audio data or the like which are communicated on the IEEE1394 bus 1. 1 quadlet (32 bits) at the MSB side of the packet is a packet header, and it comprises data length (Data Length), a tag (Tag), a channel (Channel), a transaction code (Tcode) and a synchronization code (Sy).

The byte number of data to be transmitted as an isochronous packet is described in the data length. The label on the format of the isochronous packet is set in the tag. The packet type and the transaction code are described in the transaction code. Information inherent to the application is described in the synchronization code.

An error detecting code (Header CRC) of a packet header is described in 1 quadlet subsequent to the packet header. Subsequent to the error detecting code are described a data field (Data Field) serving as a main body of audio data or the like and an error detecting code (Data CRC) of audio data or the like.

Copyright management information (EMI(Encryption Mode Information)) is described in the synchronization code of the packet header as copyright information to the content information of audio data or the like, and SCMS (Serial Copy Management System) information is described in the data field.

Figure 8A:
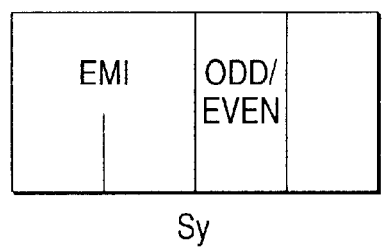
FIGS. 8A and 8B are diagrams showing the position at which copyright information is described.

Specifically, with respect to the synchronization code, the copyright management information indicating any one of four states on the allowance or prohibition of copying (Copy Free, Write Once, No More Copy, Never Copy) is described at 2 bits at the MSB side as shown in FIG. 8A.

"Copy Free", one of the four states on the copy allowance or prohibition, indicates that copying of the content data concerned is allowed without limitation in frequency. "Write Once" indicates that copying of the content data concerned is allowed only once (one generation). "No more Copy" indicates that copying of the content data concerned has been carried out once for the content data and the content data is prohibited from being further copied. "Never Copy" indicates that copying of the content data concerned is prohibited.

When content data are encrypted at the transmission side, an ODD/EVEN flag indicating the attribute of an encryption key used for the encryption is described at 1 bit subsequent to the copyright management information (described in more detail later).

Figure 8B:
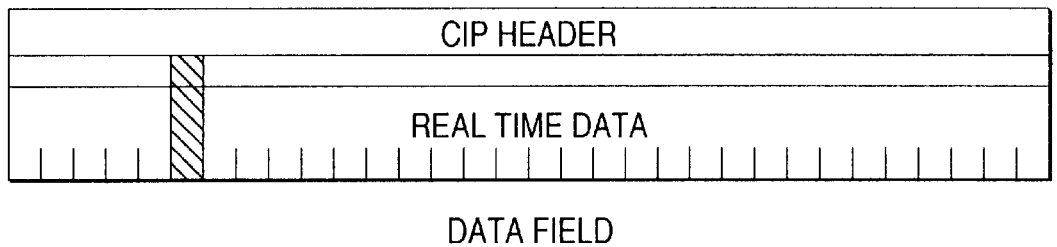

With respect to the data field, as shown in FIG. 8B, 192 bits each of which corresponds to a sixth bit from the MSB side of every 1 quadlet of real time data subsequent to a 1-quadlet CIP (Common Isochronous) header constituting the data field are arranged, and a flag indicating allowance or prohibition of copying (SCMS information) is described at the third bit from the head of the bit arrangement of the 192 bits. If "1" is described in the flag, it indicates that copying of the content data concerned is allowed. If "0" is described in the flag, it indicates that copying of the content data received is prohibited.

Figure 9:
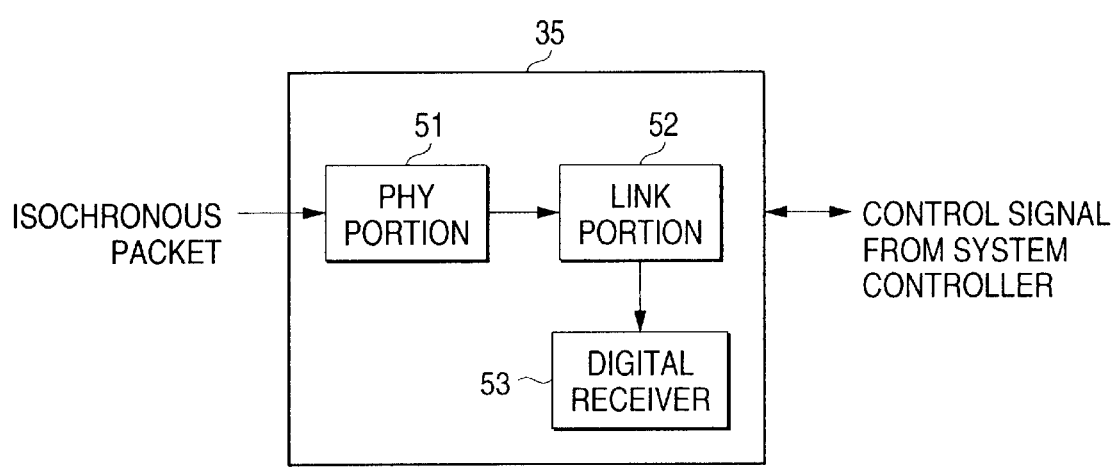
FIG. 9 is a block diagram showing the construction of a part on copyright information display processing of IEEE1394 interface 35.

FIG. 9 shows the construction of a portion of the IEEE1394 interface 35 of the optical disc drive which is associated with the copyright information notifying function.

In FIG. 9, a physical layer (PHY) portion 51 receives an isochronous packet from the IEEE1394 bus 1 and supplies it to a link (Link) layer portion 52. The link layer portion 52 records a flag indicating the supply of the isochronous packet from the physical layer portion 51 into a predetermined built-in register. The link layer portion 52 also reads out from the isochronous packet the copyright management information indicated by upper 2 bits of the synchronization code of the packet header, and judges whether the copying is allowed or prohibited to the content data received (i.e., judges whether the copyright management information is "Copy Free" or "Write Once"). Thereafter, the link layer portion 52 records into a predetermined built-in register a flag indicating whether the copying is allowed or prohibited to the content data concerned. The link layer portion 52 further outputs the isochronous packet to a digital receiver 53 in bi-phase mode.

The digital receiver 53 judges whether the isochronous packet input from the link layer portion 52 is synchronized in phase, and records a flag indicating the judgment result into a predetermined built-in register. The digital receiver 53 also reads out the above SCMS information from the isochronous packet and judges whether the copying is allowed or prohibited to the content data concerned. Thereafter, it records into a predetermined built-in register a flag indicating whether the copying is allowed or prohibited to the content data received.

Figure 10:
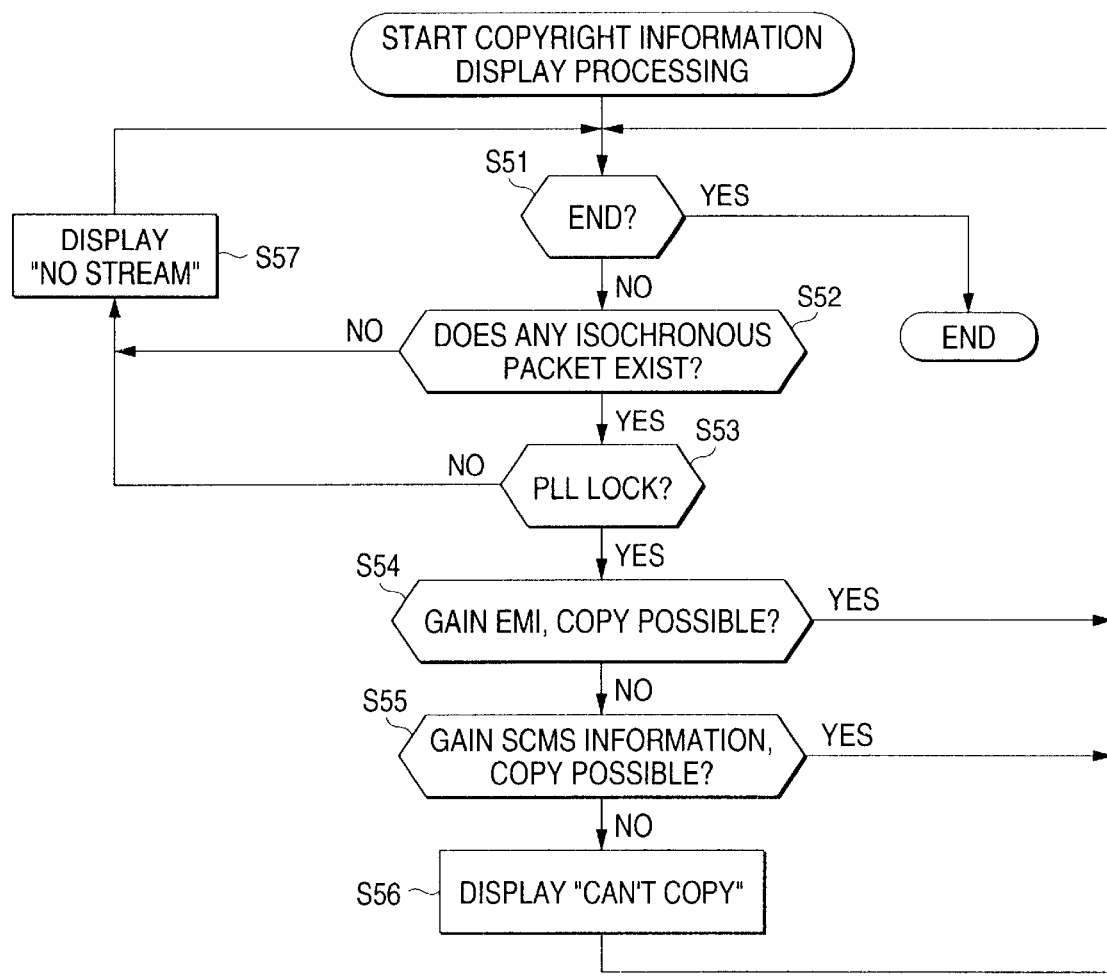
FIG. 10 is a flowchart showing copyright information display processing.

Next, the operation will be described with reference to the flowchart of FIG. 10.

For example when the optical disc drive 2 starts to receive the isochronous packet of audio data as the content data from the set top box 3 through the IEEE1394 bus 1, the system controller 21 mainly controls the IEEE1394 interface 35 on the basis of a program for copyright information display processing stored in the program ROM 38, whereby the copyright information display processing is started.

In step S51, the system controller 21 judges whether the user instructs to finish the reception of the content data. If it is judged that the finish of the reception is not instructed, the processing goes to step S52. In step S52, the system controller 21 refers to a predetermined register installed in the link layer portion 52 to judge whether the isochronous packet is input in the IEEE1394 interface 35. If it is judged that the isochronous packet is input, the processing goes to step S53.

In step S53, the system controller 21 refers to a predetermined register installed in the digital receiver 53 of the IEEE1394 interface 35 to judge whether the isochronous packet input from the link layer portion 52 is synchronized in phase. If the synchronization is judged, the processing goes to step S54. The system controller 21 judges the synchronization of the phase of the isochronous packet from the link layer portion 52 on the basis of the judgment as to whether the phase of PLL of the digital receiver 53 is locked or not, for example.

In step S54, the system controller 21 refers to a predetermined register installed in the link layer portion 52 of the IEEE1394 interface 35 to judge whether copying is allowed or prohibited to the content data concerned. If copying is judged to be prohibited, the processing goes to step S55.

In step S55, the system controller 21 refers to a predetermined register installed in the digital receiver 53 of the IEEE1394 interface 35 to judge whether copying is allowed or prohibited to the content data concerned. If copying is judged to be prohibited, the processing goes to step S56.

Figure 11A:
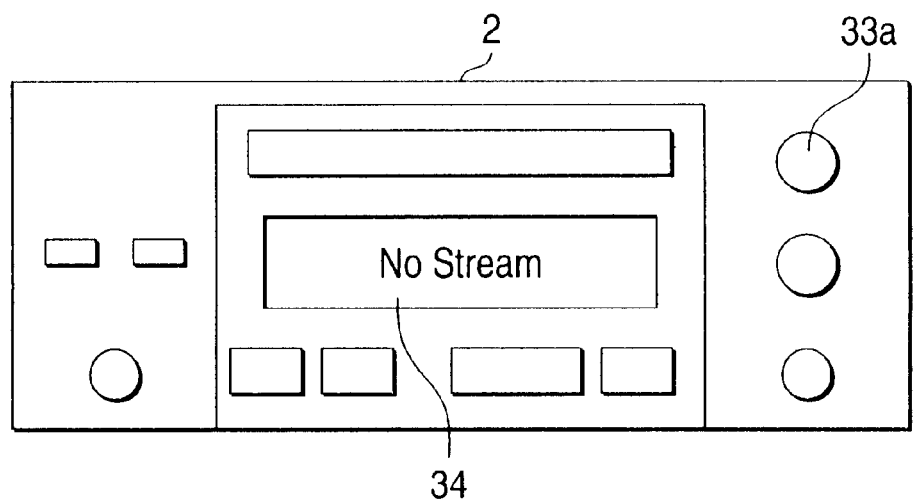
FIGS. 11A and 11B are diagrams showing a display example _of the copyright information.
Figure 11B:
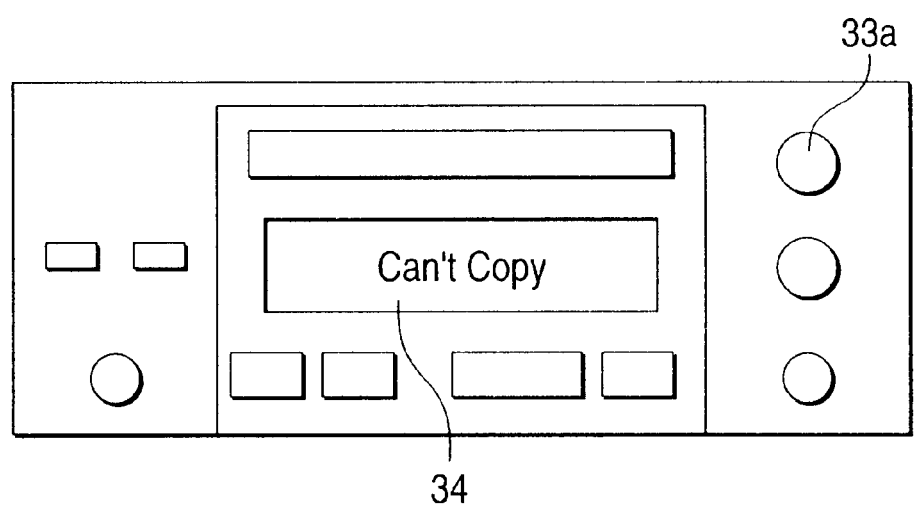

In step S56, as shown in FIG. 11B, the system controller 21 displays "Can't Copy" on the display portion 34, and notifies the user that it is impossible to copy the audio data as the content data being received. The user can immediately recognize that it is impossible to copy the content data being received when "Can't Copy" is displayed on the display portion 34. Thereafter, in step S51, the subsequent processing is repeated until the finish of the reception is instructed.

If it is judged in step S52 that no isochronous packet is input in the IEEE1394 interface 35, or it is judged in step S53 that the phase of the isochronous packet is not synchronized, the processing goes to step S57. In step S57, the system controller 21 displays "No Stream" on the display portion 34 as shown in FIG. 11A, and notifies it to the user that the audio data as the content data are not received.

If it is judged in step S54 that copying is allowed, or if it is judged in step S55 that copying is allowed, the processing returns to step S51 and the subsequent processing is repeated.

According to the copyright information display processing as described above, the user can easily recognize whether the content data being received can be copied or not.

In the copyright information display processing, if the copying is not allowed to the content data, this fact is displayed. Conversely, if the copying is allowed to the content data received, this fact may be displayed on the display portion. Further, the words indicating one of the four states which is specified for the received content data by the copyright management information, that is, "Copy Free", "Write Once", "No More Copy" or "Never Copy" may be displayed In the copyright information display processing, if the copying is not allowed to the content data, this fact is displayed. Conversely, if the copying is allowed to the content data received, this fact may be displayed on the display portion. Further, the words indicating one of the four states which is specified for the received content data by the copyright management information, that is, "Copy Free", "Write Once", "No More Copy" or "Never Copy" may be displayed on the display portion. In this case, on the basis of the display result, the user can judge whether the content data being received can be copied or not at any time. When a message indicating the allowance of copying is displayed, the user can record, that is copy the content data being received into the magnetooptical disc by operating the operating portion input selection key 33a of the optical disc drive.

In the copyright information display processing described above, if no isochronous packet exists, or if the phase synchronization is not established, "No Stream" is displayed on the display portion to notify to the user that the content data are not accurately received. However, for example when the authentication processing as the pre-processing to receive the content data as shown in FIG. 3 has not normally finished, when no authentication is made, or in other cases, "No Stream" may be displayed on the display portion to notify to the user that the content data cannot be received.

Next, the sequential processing of encrypting the isochronous packet of content data at an electronic equipment side serving as a transmission side and decoding the encrypted isochronous packet at an electronic equipment side serving as a reception side in the bus network system of this embodiment will be described by referring to a case where the isochronous packet of content data (ATRAC (Adaptive Transform Acoustic Coding) data) is encrypted and transmitted from the optical disc drive 2-1 through the IEEE1394 bus 1 to the optical disc drive 2-2.

Figure 12:
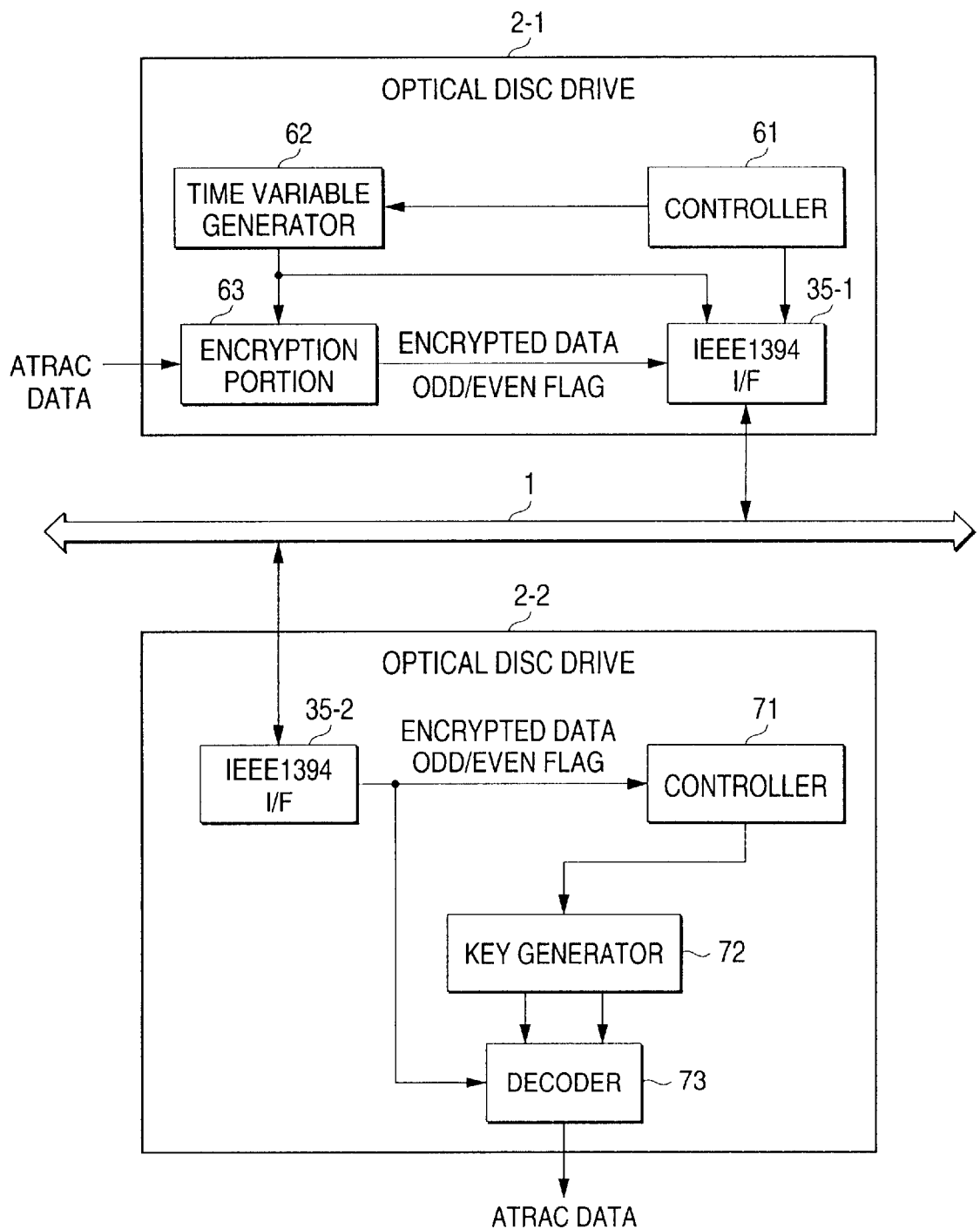
FIG. 12 is a block diagram showing the construction of a part on encryption and decoding of the isochronous packet of the optical disc drive 2.

FIG. 12 shows the construction of the part corresponding to the sequential processing of encrypting and transmitting the isochronous packet at one optical disc drive (at the transmission side) of the optical disc drives 2-1, 2-2 and decoding the encrypted isochronous packet at the other optical disc drive (at the reception side).

A controller 61 of the optical disc drive 2-1 serving as the transmission side controls a time variable generator 62 and an IEEE1394 interface 35-1. Under the control of the controller 61, the time variable generator 62 generates a time variable which is incremented one by one every 30 seconds, for example, and supplies the time variable as an encrypting key to an encrypting portion 63.

By using the encrypting key supplied from the time variable generator 62, the encrypting portion 63 encrypts ATRAC data read out from the magnetooptical disc 11 by the above-described reproducing system of the optical disc drive 2-1, adds the encrypted data thus obtained with a flag indicating the attribute of the encrypting key being used (ODD or EVEN), that is, an ODD/EVEN flag of the third bit of the synchronization code shown in FIG. 8A, and then outputs it to the IEEE1394 interface (I/F) 35-1. The IEEE1394 interface 35-1 records the encrypted data (with the ODD/EVEN flag) input from the encrypting portion 63 into a built-in FIFO buffer, and successively converts the data to isochronous packets and outputs the isochronous packets to IEEE1394 bus 1.

In response to the request from the IEEE1394 interface of another electronic equipment connected to the IEEE1394 bus 1, in this case, the request from the IEEE1394 interface 35-2 of the optical disc drive 2-2, a seed serving as information used to generate a decoding key for decoding the content data which are encrypted with a next encrypting key (in this case, an encrypting key having an attribute of EVEN) to the encrypting key being currently used for the encryption (for example, an encrypting key having an attribute of ODD) (in this case, the seed aims to generate the decoding key having an attribute of EVEN, however, the attribute of the seed concerned is ODD because the encrypting key used at the timing of the transmission of the seed concerned has an attribute of ODD) is supplied as an asynchronous packet to the electronic equipment (for example, optical disc drive 2-2) through the IEEE1394 bus 1 by the IEEE1394 interface 35-1.

A controller 71 of the optical disc drive 2-2 serving as the reception side controls a key generator 72 and a decoder 73 in accordance with the ODD/EVEN flag of the isochronous packet of the encrypted content data input from the IEEE1394 interface 35-2. The IEEE1394 interface 35-2 receives the isochronous packet of the encrypted ATRAC data (hereinafter referred to as "encrypted data") distributed to the IEEE1394 bus 1, and outputs it to the controller 71 and the decoder 73. The IEEE1394 interface 35-2 also receives through the IEEE1394 bus 1 the asynchronous packet of the seed used to generate the decoding key, and outputs it to the controller 71. This seed is supplied from the controller 71 to the key generator 72.

The key generator 72 alternately generates a decoding key having an attribute of ODD (hereinafter referred to as "ODD key") and a decoding key having an attribute of EVEN (hereinafter referred to as "EVEN key") in connection with the _seed supplied from the controller 71, and supplies it to the decoder 73. Specifically, the seed (for example, the seed having the attribute of ODD) supplied from the controller 71 and the common key obtained by the above-described authentication processing are subjected to a predetermined operation to generate the decoding key (in this case, EVEN key) and the decoding key thus generated is supplied to the decoder 73. The details of the key generating processing of the key generator 72 will be described later with reference to the flowchart of FIG. 16.

Figure 2:
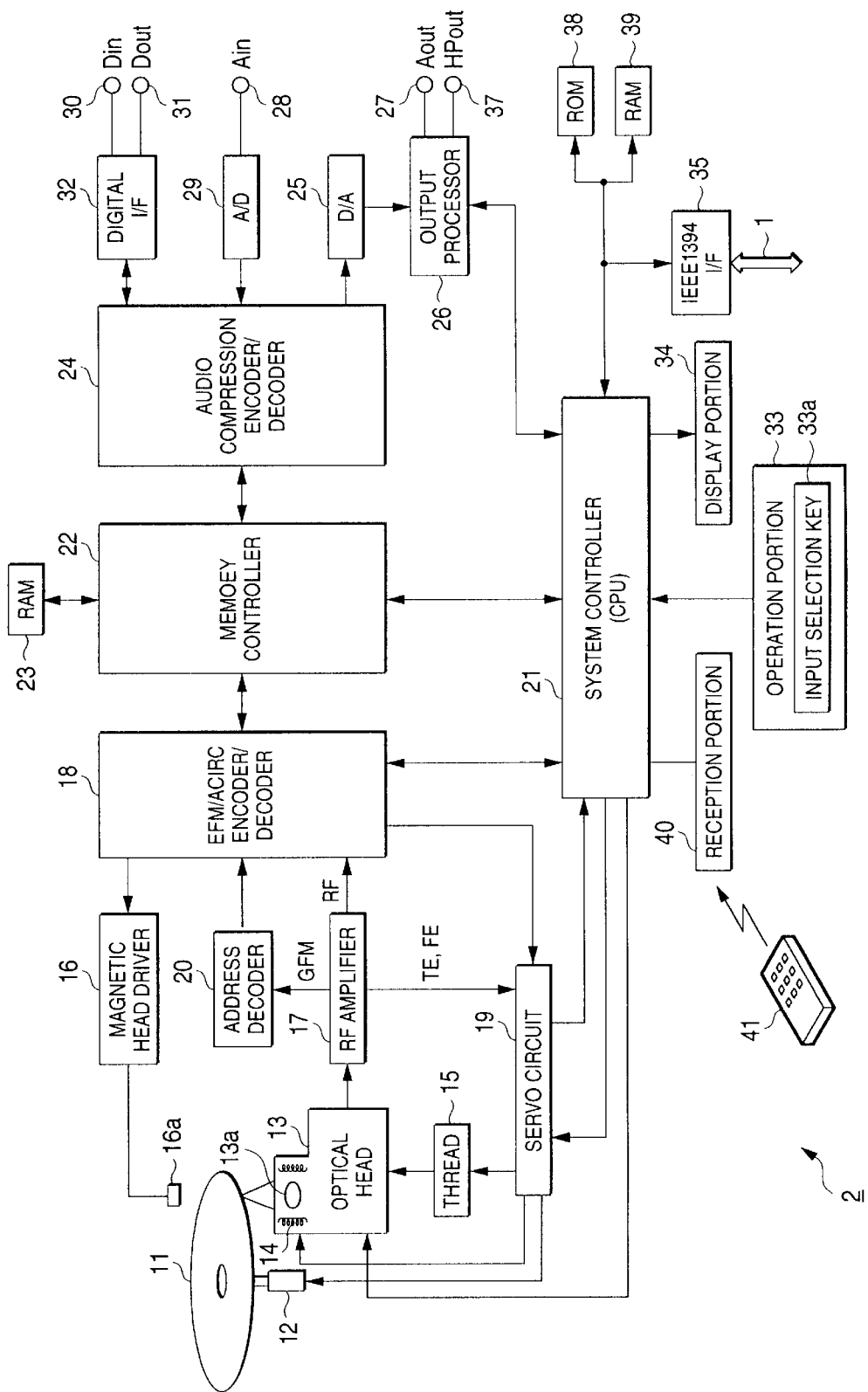
FIG. 2 is a block diagram showing the construction of an optical disc drive 2 to which the present invention is applied.

The decoder 73 decodes the encrypted data by using one of the ODD key and the EVEN key supplied from the key generator 72, which corresponds to the ODD/EVEN flag of the encrypted data input from the IEEE1394 interface 35-2, and outputs the ATRAC data as the content data thus obtained to a subsequent stage such as an encoder/decoder 24 shown in FIG. 2 to be subjected to signal processing such as expansion processing, etc. The signal-processed data are output as digital audio signals or analog audio signals.

Figure 13:
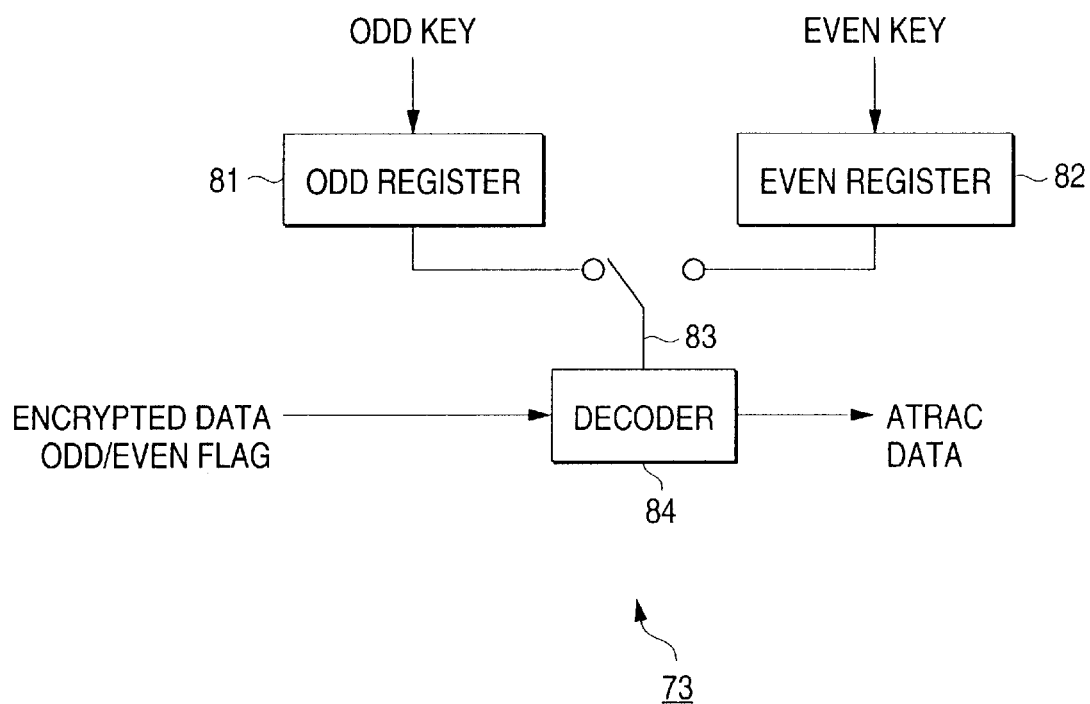
FIG. 13 is a block diagram showing the construction of a decoder 73 of FIG. 12.

FIGS. 13 shows the detailed construction of the decoder 73 of FIG. 12.

As shown in FIG. 13, in the decoder 73, the ODD key supplied from the key generator 72 is written in an ODD register 81, and the EVEN key is written in an EVEN register 82. The decoder 84 reads out the ODD/EVEN flag of the encrypted data input from the IEEE1394 interface 35-2, and switches a switch 83 in accordance with the ODD/EVEN flag thus read out. Further, the decoder 84 reads out the encrypting key (ODD key or EVEN key) from the ODD register 81 or the EVEN register 82 and decodes the encrypted data with the encrypting key concerned.

Here, the delay when the encrypted content data are communicated as an isochronous packet and the delay when the seed used to generate the decoding key is transmitted as an asynchronous packet will be described.

Figure 14:
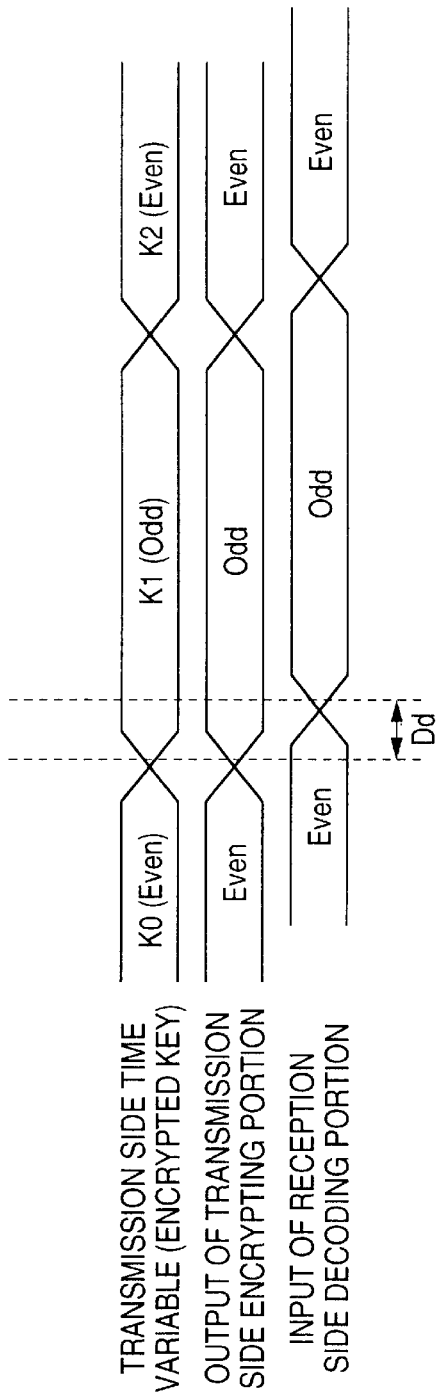
FIGS. 14A to 14C are diagrams showing the reception delay of content data communicated as an isochronous packet.

First, the delay when the encrypted content data are communicated as an isochronous packet will be described with reference to FIGS. 14A to 14C. When the time variable generator 62 successively renews the time variable (encrypting key) to K0, K1, K2 at such a timing as shown in FIG. 14A at the transmission side, the ODD/EVEN flag added to the encrypted data output from the encrypting portion 63 varies at the same timing as the time variable as shown in FIG. 14B. At the reception side, the timing at which the encrypted data concerned are received through the IEEE1394 bus 1 by the IEEE1394 interface 35-2 of the optical disc drive 2-2 and supplied to the decoder 73 is delayed from the transmission time by a time Dd due to the congestion state of the communication band of the IEEE1394 bus 1 or the like as shown in FIG. 14C.

Next, the delay when the seed used to generate the decoding key is transmitted as an asynchronous packet will be described with reference to FIGS. 15A to 15E.

Figure 15:
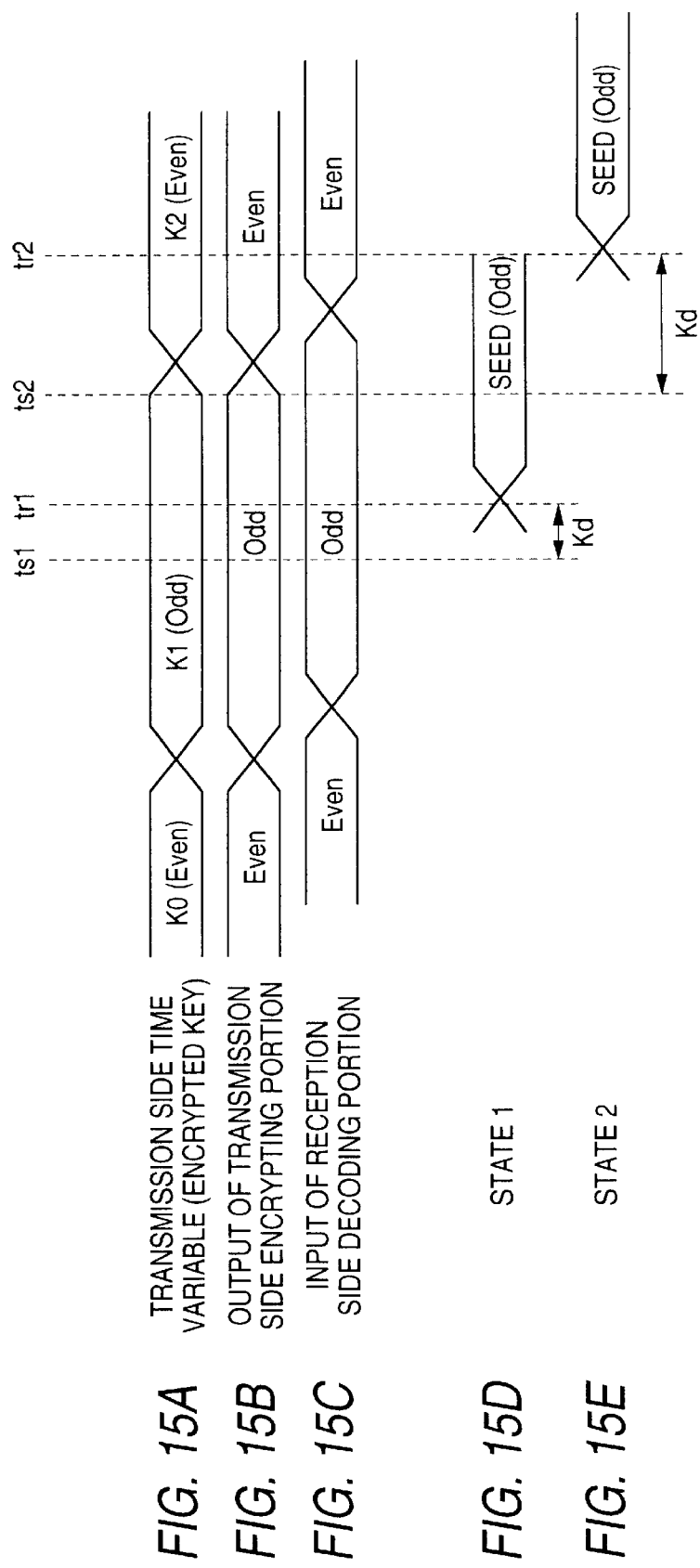
FIGS. 15A to 15E are diagrams showing the reception delay of a seed communicated as an isochronous packet.

With respect to the timing ts at which a seed having the same attribute (ODD or EVEN) as the encrypting key being currently used to encrypt content data is transmitted as an asynchronous packet at the transmission side in response to the request from the reception side, the timing tr at which the ODD key or EVEN key for decoding is generated on the basis of the seed concerned and supplied to the decoder 73 is delayed as shown by any one of two states of FIGS. 15D and 15E due to processing in the IEEE1394 interface 35-2 and the key generator 72, the congestion state of the communication band of the IEEE1394 bus 1, etc.

That is, the state 1 shown in FIG. 15D corresponds to the state in which the attribute (ODD) of the content data received as the isochronous packet is coincident with the attribute (ODD) of the seed received as the asynchronous packet, and the state 2 shown in FIG. 15E corresponds to the state in which the attribute (EVEN) of the content data received as the isochronous packet is not coincident with the attribute (ODD) received as the asynchronous packet.

In the case of the state 1 shown in FIG. 15D, if a decoding key having the attribute of "EVEN" is generated by using a seed having the attribute of "ODD", content data encrypted with an encrypting key K2 (whose attribute is EVEN) which is subsequently received can be decoded. On the other hand, in the case of the state 2 shown in FIG. 15E, if a decoding key having the attribute of "EVEN" is generated by using a seed having the attribute of "ODD", content data encrypted with an encrypting key K3 (whose attribute is ODD) which is subsequently received cannot be decoded.

Figure 16:
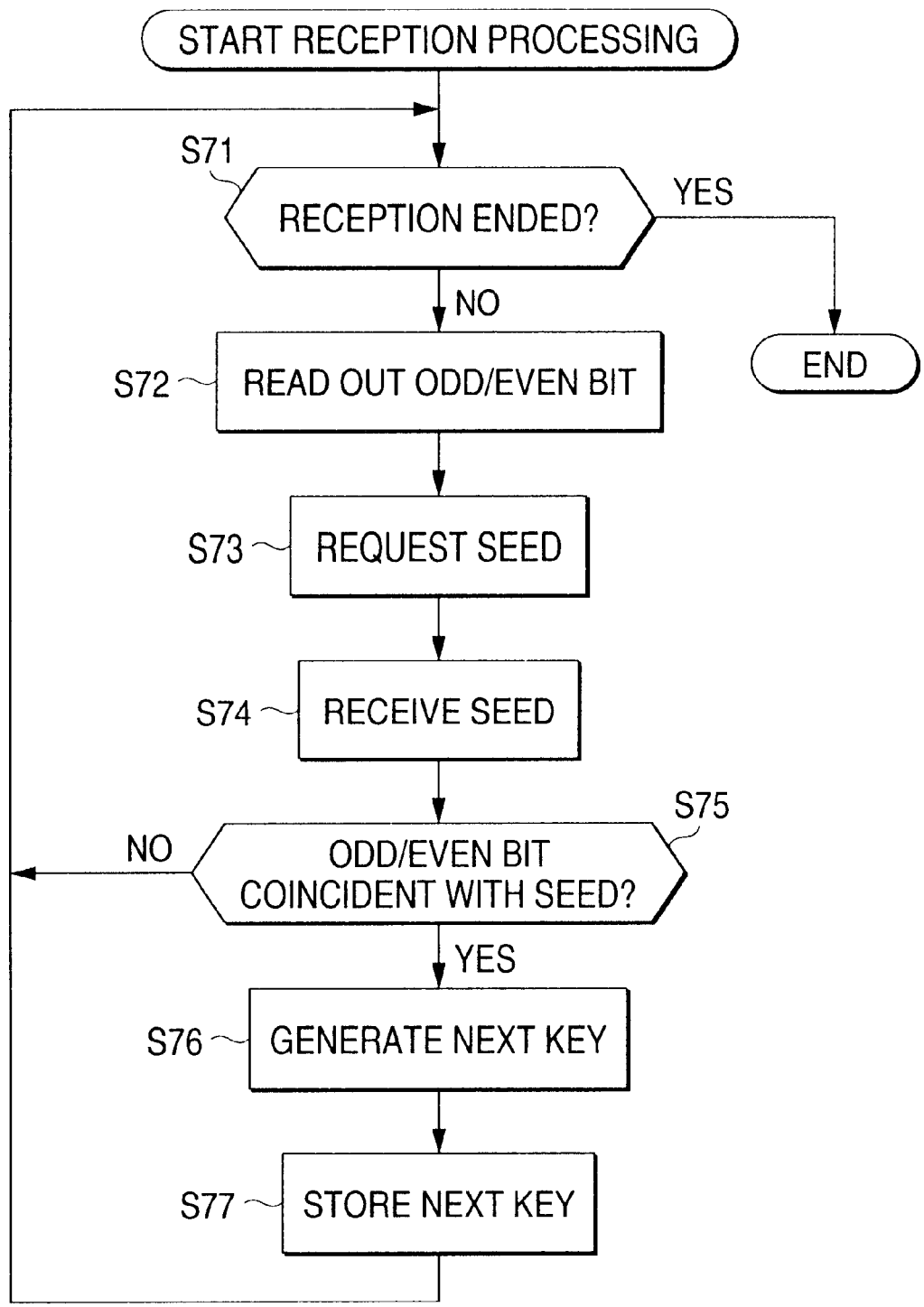
FIG. 16 is a flowchart showing key generation processing.

Therefore, in order to avoid such a disadvantage, key generating processing which is operated to prevent a decoding key from being generated by using a seed when the attribute of the seed concerned is different from that of encrypted data will be described with reference to the flowchart of FIG. 16. The key generating processing is started at the time when the encrypted data are received through the IEEE1394 bus 1 in the optical disc drive 2-2.

In step S71, the controller 71 judges whether the reception of the encrypted data has finished. If it is judged that the reception has not yet been finished, the processing goes to step S72. In step S72, the step controller 71 reads outs the ODD/EVEN flag of the encrypted data input from the IEEE1394 interface 35-2.

In step S73, under the control of the controller 71, the IEEE1394 interface 35-2 requests the transmission of a seed to the IEEE1394 interface 35-1 of the optical disc drive 2-1 through the IEEE1394 bus 1. In response to this request, the IEEE1394 interface 35-1 of the optical disc drive 2-1 transmits as an asynchronous packet a seed having the same attribute as the encrypting key being currently used to encrypt the content data.

The asynchronous packet of the seed concerned is received by the IEEE1394 interface 35-2 of the optical disc drive 22 and supplied to the controller 71 in step S74. In step S75, the controller 71 judges whether the attribute of the ODD/EVEN flag of the encrypted data read out in step S72 is coincident with the attribute of the seed supplied in step S74, and if a coincidence is found, the processing goes to step S76.

In step S76, the key generator 72 performs a predetermined operation on the seed supplied from the controller 71 and the common key obtained by the above-described authentication processing to generate a decoding key having an attribute different from the attribute of the seed, and then supplies the decoding key to the decoder 73. In step S77, the decoder 73 records the decoding key supplied from the key generator 72 into the ODD register 81 or the EVEN register 82 in connection with the attribute of the decoding key.

If it is judged in step S75 that the attribute of the ODD/EVEN flag of the encrypted data read out in step S72 is not coincident with the attribute of the seed supplied in step S74, the processing goes to step S71. Accordingly, in this case, any next decoding key is not generated.

However, since the subsequent processing is periodically repeated until it is judged in step S71 that the reception is finished, in step S75 of second and subsequent operations, it is judged that the attribute of the ODD/EVEN flag of the encrypted data read out in step S72 is coincident with the attribute of the seed supplied in step S74, and a decoding key is successively generated.

As described above, the attribute of the seed and the attribute of the encrypted data are compared with each other, and the decoding key is generated in connection with the comparison result. Therefore, the encrypted data can be normally decoded.

In the above-described embodiment, the present invention is mainly applied to the optical disc drive 2. However, the present invention may be applied to electronic equipment having the set top box 3, the personal computer 4 and the IEEE1394 interface.

The above sequential processing may be executed by hardware, however, it may be executed by software. If the sequential processing is executed by software, the program constituting the software is installed in a computer (corresponding to the system controller 21 of FIG. 2) installed in an optical disc drive 2 as a special-purpose hardware, or for example a general-purpose personal computer which can execute various functions by installing various programs.

Next referring to FIGS. 17(A) and 17(C), a medium used to install the program executing the above-described sequential processing into a computer and make the program executable by the computer will be described while the present invention is applied to a case where the computer is a general-purpose personal computer.

Figure 17A:
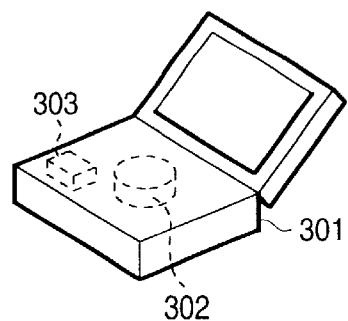
FIGS. 17A to 17C are diagrams showing a medium used to install a program into a personal computer 301 and make it executable.

As shown in FIG. 17A, the program may be supplied to a user while it is beforehand installed in a hard disc 302 as a recording medium contained in a personal computer 301 or a semiconductor memory 303 (corresponding to the program RAM 38 in FIG. 2).

Figure 17B:
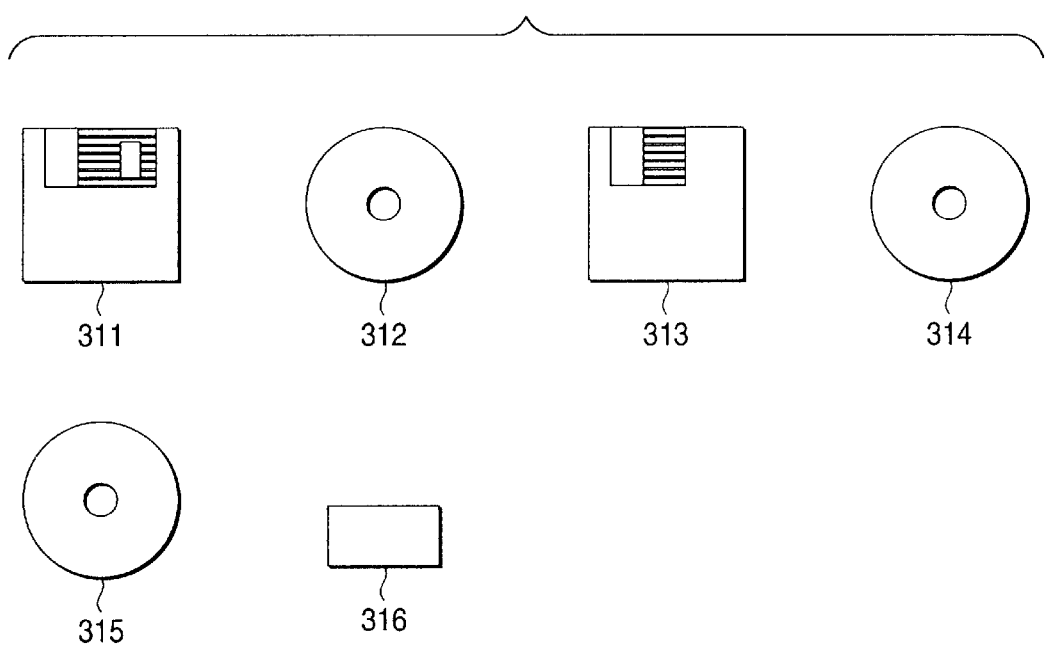

Alternatively, as shown in FIG. 17B, the program may be supplied as a software package while it is temporarily or permanently stored in a recording medium such as a floppy disk 311, CD-ROM (Compact Disc-Read Only Memory) 312, MO (Magneto-optical) disc 313, DVD (Digital Versatile Disc) 314, a magnetic disc 315, a semiconductor memory 316 or the like.

Figure 17C:
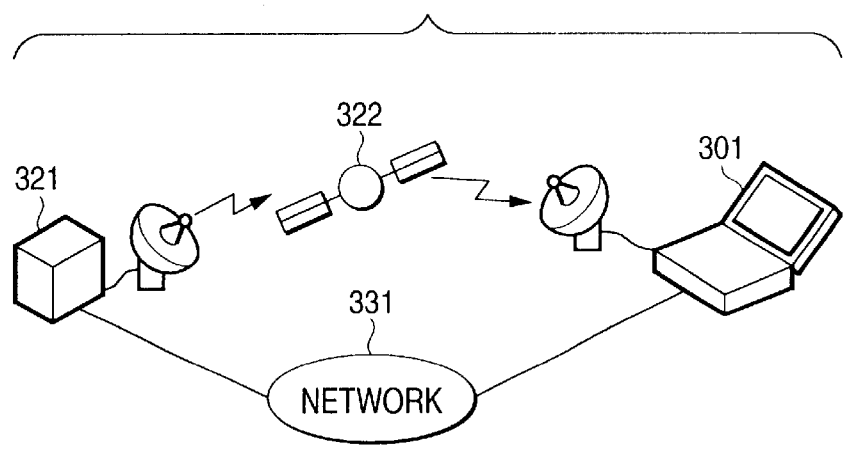

Further, as shown in FIG. 17C, the program may be transmitted from a download site 321 through a satellite 322 to a personal computer 301 in a wireless (radio) communication mode, or transmitted through a network 331 such as a local area network or the Internet to the personal computer in a wire communication mode or wireless (radio) communication mode, and then stored in a hard disc 302 or the like contained in the personal computer 301.

The medium defined in this specification means a broad concept covering all the above media.

Figure 18:
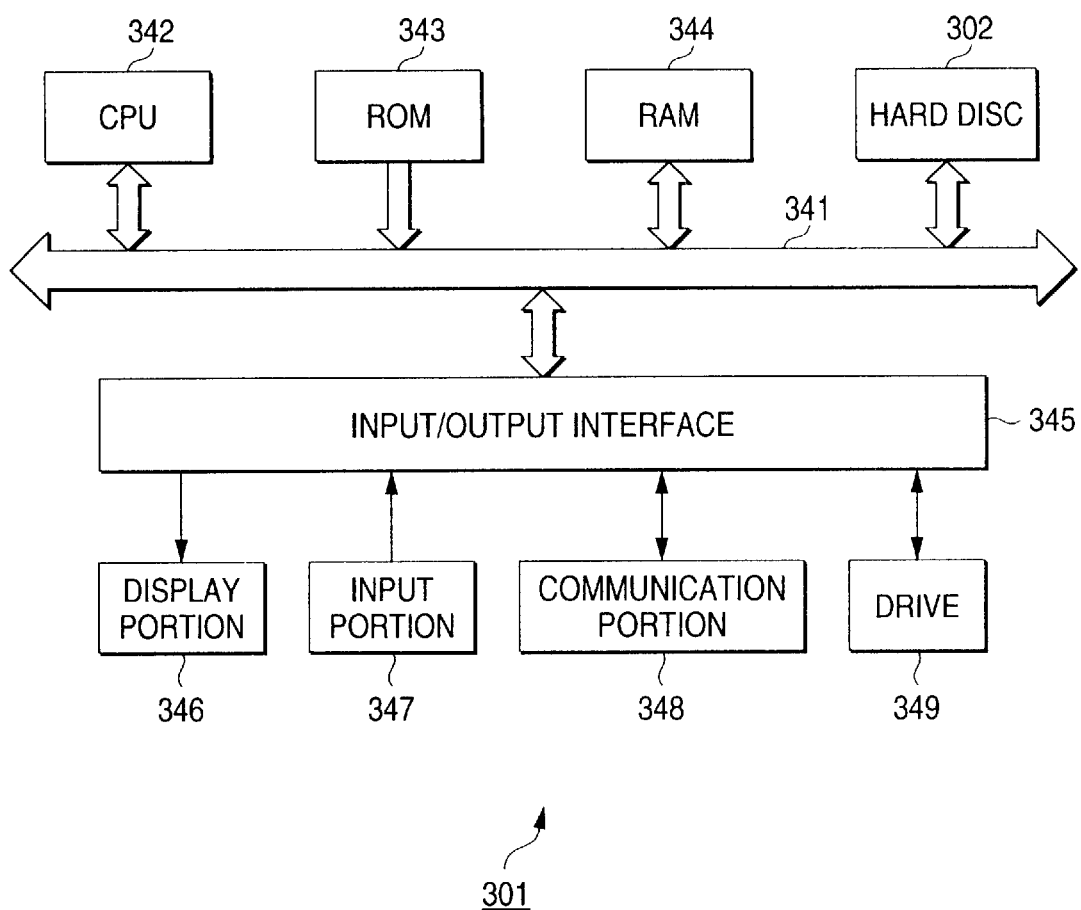
FIG. 18 is a diagram showing the personal computer 301.

The personal computer 301 contains CPU (Central Processing Unit) 342 as shown in FIG. 18, for example. The CPU 342 is connected to an input/output interface 345 through a bus 341. When an instruction is input from an input portion 347 comprising a keyboard, a mouse, etc. through the input/output interface 345 to the CPU 342 by a user, the program stored in the ROM (Read Only Memory) 343 corresponding to the semiconductor memory 303 of FIG. 17A is transmitted from a satellite 322 or a network 331 in response to the instruction, and received by a communication portion 348. Further, the program installed in the hard disc 302 or the program which is read out from a floppy disk 311, CD-ROM 312, an MO disc 313, DVD 314 or a magnetic disc 315 fitted to drive 349 and then installed in the hard disc 302 is loaded in RAM (Random Access Memory) 344 and executed. Further, CPU 342 outputs the processing result through the input/output interface 345 to a display portion 346 such as LCD (Liquid Crystal Display) or the like, if necessary.

In this specification, the step of describing the program supplied from the medium contains not only the processing which is carried out time-sequentially in a described order, but also the processing which is not executed time-sequentially, but executed in parallel or individually.

Further, in this specification, the system represents the overall device comprising plural devices.

What is claimed is:

1. An electronic device for receiving encrypted data containing content data transmitted in the form of a packet through a bus, comprising:
   a receiving portion for receiving said data transmitted in the form of a packet through said bus;
   a judgment portion for extracting copyright information from said data supplied from said receiving portion, and judging based upon said extracted copyright information whether said content data contained in said received data are allowed to be copied; an output controller for receiving a judgment result from said judgment portion and generating and outputting notification data corresponding to said judgment result; and
   a decoder controlled by said output controller for decoding the encrypted data by detecting a coincidence between an attribute of an isochronous packet and an attribute of a seed used to generate a key for decoding the encrypted data, wherein when no coincidence is detected coincidence detection is repeated and the attribute of the seed is incremented whereby a time delay between a transmission over the bus and a reception thereof is compensated.

2. The electronic equipment claimed in claim 1, wherein when said judgment result indicates that it is impossible to copy said content data contained in said received data, said output controller generates and outputs notification data for notifying a user that it is impossible to copy said content data.

3. The electronic equipment claimed in claim 2, wherein said output controller is equipped with a controller for generating said notification data on the basis of said judgment result and a display portion for performing a display operation based on said notification data supplied from said controller.

4. The electronic device claimed in claim 1, wherein said judgment portion judges based upon further copyright information contained in said content data contained in said received data whether said content data is allowed to be copied.

5. The electronic equipment claimed in claim 4, wherein when both said judgment result based on said extracted copyright information and said judgment result based on said further copyright information indicate that it is impossible to copy said content data contained in said received data, said output controller generates and outputs said notification data for notifying said user that it is impossible to copy said content data.

6. The electronic equipment claimed in claim 5, wherein said output controller comprises a controller for generating said notification data based upon said judgment result and a display portion for performing a display operation based on said notification data supplied from said controller.

7. The electronic equipment claimed in claim 1, wherein said output controller detects a reception state of said content data contained in said received data, and generates further notifying data based upon the result of said reception state detection.

8. The electronic equipment claimed in claim 7, wherein when it is detected that said content data contained in said received data have not been accurately received, said output controller generates and outputs said further notification data for notifying said user of said detection result.

9. The electronic equipment claimed in claim 8, wherein when it is detected that the packet synchronization of said received data has not been established, said output controller generates and outputs said further notification data.

10. The electronic equipment claimed in claim 8, wherein when no packets of said received data exist, said output controller generates and outputs said further notification data.

11. The electronic equipment claimed in claim 7, wherein said output controller comprises a controller for generating said notification data based upon said detection result, and a display portion for displaying said notification data supplied from said controller.

12. The electronic equipment claimed in claim 1, wherein said bus is an IEEE1394 bus.

13. A data processing method utilizing an electronic device for receiving encrypted data containing content data transmitted in the form of a packet through a bus, comprising the steps of:
   receiving said data transmitted in the form of a packet through said bus;
   extracting copyright information from said received data;
   judging based upon said extracted copyright information whether said content data contained in said received data are allowed to be copied and generating a judgment result;
   generating and outputting notification data corresponding to said judgment result; and
   controlling a decoder for decoding the encrypted data by detecting a coincidence between an attribute of an isochronous packet and an attribute of a seed used to generate a key for decoding the encrypted data, wherein when no coincidence is detected coincidence detection id repeated and the attribute of the seed is incremented, whereby a time delay between a transmission over the bus and a reception thereof is compensated.

14. The data processing method claimed in claim 13, wherein when said judgment result indicates that it is impossible to copy said content data contained in said received data, said output controller generates and outputs notification data for notifying a user that it is impossible to copy said content data.

15. The data processing method claimed in claim 13, wherein it is judged based upon further copyright information contained in said content data contained in said received data whether said content data is allowed to be copied and a judgment result based upon said further copyright information is generated.

16. The data processing method claimed in claim 15, wherein when both said judgment result based on said extracted copyright information and said judgment result based on said further copyright information indicate that it is impossible to copy said content data contained in said received data, said output controller generates and outputs said notification data for notifying said user that it is impossible to copy said content data.

17. The data processing method claimed in claim 12, wherein a reception state of said content data contained in said received data is detected, and further notifying data are generated based upon the result of said reception state detection.

18. The data processing method claimed in claim 17, wherein when it is detected that said content data contained in said received data have not been accurately received, said further notification data for notifying said user of said detection result are generated and output.

19. The data processing method claimed in claim 18, wherein when it is detected that the packet synchronization of said received data is not established, said further notification data are generated and output.

20. The data processing method claimed in claim 18, wherein when it is detected that no packets of said received data exist, said further notification data are generated and output.

21. The data processing method claimed in claim 13, wherein said bus is an IEEE1394 bus.

22. Electronic equipment for receiving encrypted data containing content data and attribute information indicating an attribute of an encrypting key transmitted in the form of a packet through a bus, comprising:

a receiving portion for receiving said data transmitted in the form of a packet through said bus;

a judgment portion for extracting copyright information from said data supplied from said receiving portion and judging based upon said extracted copyright information whether said content data contained in said received data are allowed to be copied;

an output controller for receiving a judgment result from said judgment portion and generating and outputting notification data corresponding to said judgment result; and a decoder controlled by said output controller for decoding the encrypted data by detecting a coincidence between an attribute of an isochronous packet and an attribute of a seed used to generate a key for decoding the encrypted data, wherein when no coincidence is detected coincidence detection id repeated and the attribute of the seed is incremented, whereby a time delay between a transmission over the bus and a reception thereof is compensated.

23. The electronic equipment claimed in claim 22, further comprising a key generator for generating plural decoding keys, and a decoder for performing decoding processing on said data supplied from said receiving portion based upon said decoding key from said key generator, wherein said output controller selects one of said plural decoding keys output from said key generator based upon said attribute information extracted from said data output from said receiving portion, and supplies said selected decoding key to said decoder.

24. The electronic equipment claimed in claim 23, wherein said output controller further comprises a judgment portion for identifying said attribute information extracted from said data output from said receiving portion, and a selector for selecting plural decoding keys output from said key generator based upon said judgment result from said judgement portion.

25. The electronic equipment claimed in claim 23, wherein after said encrypted data is received, said output controller requests a transmission source of said encrypted data to transmit data indicating an attribute corresponding to an encrypting key used to generate said encrypted data, and instructs said key generator to generate a decoding key when said encrypting key attribute indicating data transmitted from said transmission source is coincident with said judgment result of said attribute information.

26. The electronic equipment claimed in claim 25, wherein said output controller instructs said key generator not to generate a decoding key when said encrypting key attribute indicating data transmitted from said transmission source is not coincident with said judgment result of said attribute information.

27. The electronic equipment claimed in claim 25, wherein said key generator performs a predetermined operation on a common key along with said transmission source to generate a decoding key indicating an attribute different from an attribute indicated by said encrypting key attribute indicating data and supplies said decoding key thus generated to said decoder, and said decoder stores said decoding key thus supplied.

28. The electronic equipment claimed in claim 22, wherein when said judgment result indicates that it is impossible to copy said content data contained in said received data, said output controller generates and outputs notification data indicating to a user that it is impossible to copy said content data.

29. The electronic equipment claimed in claim 28, wherein said output controller comprises a controller for generating said notification data based upon said judgment result, and a display portion for performing a display operation based on said notification data supplied from said controller.

30. The electronic equipment claimed in claim 22, wherein said bus is an IEEE1394 bus.

31. Electronic equipment for receiving encrypted data containing content data and attribute information indicating an attribute of an encrypting key transmitted in the form of a packet through a bus, comprising:

a receiving portion for receiving said data transmitted in the of a packet through said bus;

a key generator for generating plural decoding keys;

a decoding portion for performing decoding processing on data supplied from said receiving portion based upon a decoding key from said key generator;

a controller for selecting and supplying one of plural decoding keys output from said key generator based upon said attribute information extracted from said data output from said receiving portion; and a decoder controlled by said controller for decoding the encrypted data by detecting a coincidence between an attribute of an isochronous packet and an attribute of a seed used to generate a key for decoding the encrypted data, wherein when no coincidence is detected coincidence detection id repeated and the attribute of the seed is incremented, whereby a time delay between a transmission over the bus and a reception thereof is compensated.

32. The electronic equipment claimed in claim 31, wherein said controller further comprises a judgment portion for judging said attribute information extracted from said data output from said receiving portion and for generating and outputting a judgment result, and a selector for selecting plural decoding keys output from said key generator based upon a judgment result from said judgment portion.

33. The electronic equipment claimed in claim 31, wherein after said encrypted data is received, said controller requests a transmission source of said encrypted data to transmit data indicating an attribute corresponding to an encrypting key used to generate said encrypted data, and controls said key generator to generate a decoding key when said encrypting key attribute indicating data transmitted from said transmission source are coincident with said judgment result of said attribute information.

34. The electronic equipment claimed in claim 33, wherein said controller instructs said key generator not to generate a decoding key when said encrypting key attribute indicating data transmitted from said transmission source is not coincident with said judgment result of said attribute information.

35. The electronic equipment claimed in claim 33, wherein said key generator performs a predetermined operation on a common key with said transmission source to generate a decoding key indicating an attribute different from an attribute indicated by said encrypting key attribute indicating data and supplies said decoding key thus generated to said decoder, and said decoder stores said decoding key thus supplied.

36. The electronic equipment claimed in claim 22, wherein said bus is an IEEE 1394 bus.

37. A data processing method using at least two electronic apparatuses connected to each other through a bus, one apparatus serving as a receiver apparatus receiving encrypted data containing content data and attribute information indicating an attribute of an encrypting key transmitted in the form of a packet from said other apparatus serving as a transmitter apparatus, comprising the steps of:

receiving said data transmitted in the form of a packet through said bus by said electronic apparatus serving as a receiver apparatus;

generating plural decoding keys on said electronic apparatus serving as a receiver apparatus;

performing decoding processing on said data received based upon the decoding key generated in said electronic apparatus serving as a receiver apparatus;

selecting one of plural decoding keys generated based upon said attribute information extracted from said received data on said electronic apparatus serving as a receiver apparatus, and using said selected decoding key thus selected for said decoding processing; and controlling a decoder for decoding the encrypted data by detecting a coincidence between an attribute of an isochronous packet and an attribute of a seed used to generate a key for decoding the encrypted data, wherein when no coincidence is detected coincidence detection id repeated and the attribute of the seed is incremented, whereby a time delay between a transmission over the bus and a reception thereof is compensated.

38. The data processing method claimed in claim 37, wherein after said encrypted data is received, said electronic apparatus serving as a transmitter apparatus is requested to transmit data indicating an attribute corresponding to an encrypting key used to generate said encrypted data, and said decoding key is generated when said encrypting key attribute indicating data transmitted from said electronic apparatus serving as a transmitter apparatus is judged to be coincident with said attribute information on said electronic apparatus serving as said reception side.

39. The data processing method claimed in claim 3B, wherein when said encrypting key attribute indicating data transmitted from said electronic apparatus serving as a transmitter apparatus is judged not to be coincident with said attribute information on said electronic apparatus serving as a receiver apparatus, said decoding key is not generated.

40. The data processing method claimed in claim 33, wherein authentication processing is carried out between said electronic apparatus serving as a transmitter apparatus and said electronic apparatus serving as a receiver apparatus, a common key is generated based upon a result of said authentication processing, said common key generated in said electronic apparatus serving as a receiver apparatus is subjected to a predetermined operation to generate a decoding key indicating an attribute different from an attribute indicated by said encrypting key attribute indicating data.

41. The data processing method claimed in claim 37, wherein said bus is an IEEE 1394 bus.

* * * * *